US011030716B2

(12) United States Patent
Aoyama

(10) Patent No.: US 11,030,716 B2
(45) Date of Patent: Jun. 8, 2021

(54) IMAGE PROCESSING APPARATUS

(71) Applicant: CANON KABUSHIKI KAISHA, Tokyo (JP)

(72) Inventor: Satoshi Aoyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 16/272,375

(22) Filed: Feb. 11, 2019

(65) Prior Publication Data
US 2019/0251661 A1 Aug. 15, 2019

(30) Foreign Application Priority Data
Feb. 13, 2018 (JP) .............................. JP2018-023276

(51) Int. Cl.
*G06T 3/40* (2006.01)
*H04N 5/00* (2011.01)
*H04N 5/262* (2006.01)
*H04N 5/232* (2006.01)

(52) U.S. Cl.
CPC ....... *G06T 3/4038* (2013.01); *H04N 5/23238* (2013.01); *H04N 5/2628* (2013.01)

(58) Field of Classification Search
CPC combination set(s) only.
See application file for complete search history.

(56) References Cited

U.S. PATENT DOCUMENTS

| 9,934,823 | B1* | 4/2018 | Bentley | ............... G11B 27/031 |
| 10,110,814 | B1* | 10/2018 | Day | ..................... G06T 3/0018 |
| 2011/0075945 | A1* | 3/2011 | Yamaji | .................... G06T 11/60 382/284 |
| 2013/0272611 | A1* | 10/2013 | Nakamura | ............ H04N 5/232 382/175 |
| 2016/0381306 | A1* | 12/2016 | Yang | ................... G11B 27/031 386/280 |

FOREIGN PATENT DOCUMENTS

JP 2011082917 A 4/2011

* cited by examiner

*Primary Examiner* — Jeffrey A Williams
(74) *Attorney, Agent, or Firm* — Canon U.S.A., Inc. IP Division

(57) ABSTRACT

An image processing apparatus includes an acquisition unit configured to acquire a panoramic image, and a moving image generation unit configured to generate a moving image based on the panoramic image, the moving image generation unit configured to crop the panoramic image by sequentially moving a position of a cropping area for cropping the panoramic image, thereby generating a moving image in which a plurality of cropped images cropped by changing the position of the cropping area is sequentially reproduced, wherein according to an aspect ratio or a size in a predetermined direction of the panoramic image, the moving image generation unit switches whether to crop the panoramic image with a predetermined aspect ratio or crop the panoramic image with an aspect ratio different from the predetermined aspect ratio.

10 Claims, 15 Drawing Sheets

FIG.15

| SCENE NUMBER | FILE INFORMATION | CHAPTER | NUMBER OF FRAMES | VERTICAL AND HORIZONTAL SIZES | PANORAMIC IMAGE |
|---|---|---|---|---|---|
| 1 | DCIM/100_1010/MDG_0001.MP4 | 1 | 150 | 1920 × 1080 | — |
| 2 | DCIM/100_1010/IMG_0002.JPG | — | 60 | 4000 × 3000 | — |
| 3 | DCIM/100_1010/IMG_0003.JPG | — | 60 | 3000 × 4000 | — |
| 4 | DCIM/100_1010/IMG_0020.JPG | — | 120 | 1080 × 5000 | ○ |
| ... | ... | ... | ... | ... | ... |
| 50 | DCIM/100_1010/MDG_0001.MP4 | 22 | 120 | 1920 × 1080 | — |

1501 1502 1503 1504 1505 1506

IMAGE PROCESSING APPARATUS

BACKGROUND OF THE INVENTION

Field of the Invention

The present invention relates to an image processing apparatus for treating a panoramic image.

Description of the Related Art

Conventionally, in a digital camera or a smartphone, generally, a user creates an album moving image including a series of images, using captured still images and moving images and enjoys the album moving image with their family and friends. To enjoy the album moving image, a variety of effects are provided, such as the addition of text data to the still images and the moving images as materials for the album moving image, and the recording of the still images and the moving images with a transition such as a fade or background music (BGM).

Further, in recent years, in a digital camera and a smartphone, various image capturing methods are provided. Among these methods, panoramic image capturing for imaging a scenery spreading out in a wide range is also broadly used. A panoramic image captured by panoramic image capturing is recorded with an aspect ratio greatly different from that of a normally captured still image. The panoramic image represents the entirety of ambient atmosphere when an image is captured, and is suitable as a material target of an album moving image. To import the panoramic image into the album moving image, it is necessary to convert the panoramic image into a moving image, Japanese Patent Application Laid-Open No. 2011-082917 discusses a method for creating from a panoramic image a panning moving image overlooking the entirety of the panoramic image.

A method for generating a panning moving image from a panoramic image and reproducing the panning moving image is an effective expression method. The mere generation of the panning moving image, however, may impair the visual quality of the panning moving image. For example, in a case where a plurality of images including a panoramic image is successively reproduced, and if only a panning moving image greatly exceeds four seconds while the reproduction time of another scene is determined as four seconds, the visual quality of the entirety of this album moving image is impaired. Further, although BGM is a slow tempo musical composition, and if the slide speed of a panning moving image is fast, the difference between the panning moving image and another scene becomes conspicuous. Thus, such a scene cannot be said to be appropriate as one scene in an album moving image. As a result, the visual quality of the entirety of the album moving image is impaired.

SUMMARY OF THE INVENTION

Embodiments of the present invention are directed to, when generating a moving image from a panoramic image, generating the moving image according to the situation, thereby generating the moving image with excellent visual quality.

According to some embodiments of the present invention, there is provided an image processing apparatus including an acquisition unit configured to acquire a panoramic image, and a moving image generation unit configured to, based on a plurality of cropped images cropped from the panoramic image by sequentially moving a position of a cropping area, generate a moving image in which the plurality of cropped images is sequentially reproduced, wherein according to a size in a predetermined direction or an aspect ratio of the panoramic image, the moving image generation unit switches whether to crop the panoramic image with a predetermined aspect ratio or crop the panoramic image with an aspect ratio different from the predetermined aspect ratio.

According to some embodiments of the present invention, there is provided an image processing apparatus including an acquisition unit configured to acquire a panoramic image, and a display control configured to perform control to sequentially display a plurality of cropped images cropped from the panoramic image by sequentially moving a position of a cropping area, wherein according to a size in a predetermined direction or an aspect ratio of the panoramic image, the display control unit switches whether to crop the panoramic image with a predetermined, aspect ratio or crop the panoramic image with an aspect ratio different from the predetermined aspect ratio.

According to embodiments of the present invention, it is possible to generate an appropriate moving image from a panoramic image.

Further features of the present invention will become apparent from the following description of exemplary embodiments with reference to the attached drawings.

BRIEF DESCRIPTION OF THE DRAWINGS

FIG. 15 is a diagram illustrating a configuration of a scenario.

DESCRIPTION OF THE EMBODIMENTS

A first exemplary embodiment will be described taking a digital camera as an example of an image capturing apparatus. Alternatively, a camera-equipped mobile phone may be used. Yet alternatively, embodiments of the present invention may be achieved by an information processing apparatus or an image processing apparatus capable of acquiring, through a recording medium or communication, an image captured by an image capturing apparatus.

Figure 1:
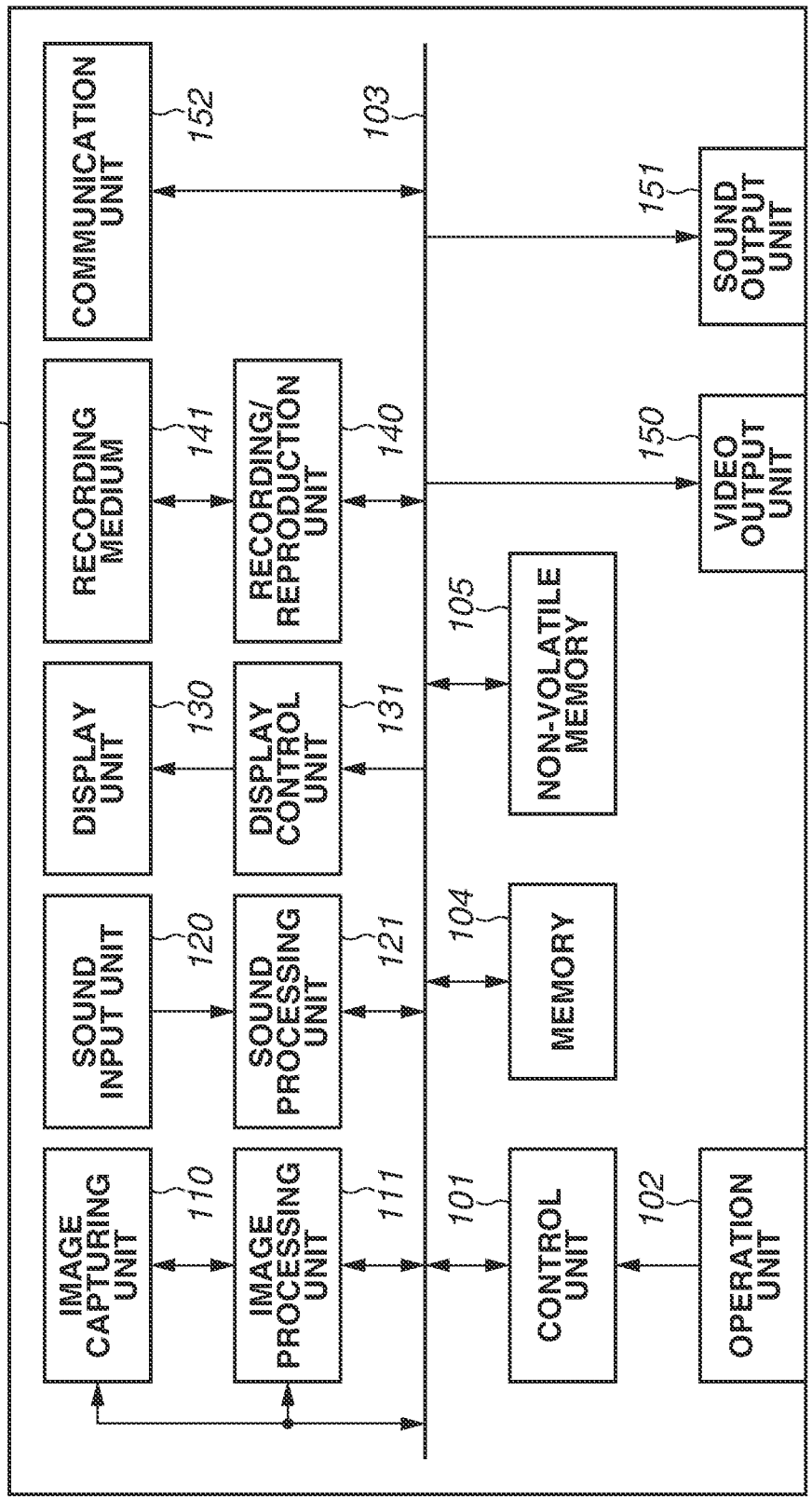
FIG. 1 is a configuration block diagram of a digital camera.

With reference to FIG. 1, the main components of an image capturing apparatus (digital camera) 100 according to the present exemplary embodiment are described below.

In FIG. 1, a control unit 101 includes one or more processors, and for example, includes a central processing unit (CPU) (a microprocessor unit (MPU)), memories (a dynamic random-access memory (DRAM) and a static random-access memory (SRAM)), and a non-volatile memory (an Electrically Erasable Programmable Read-Only Memory (EEPROM)). Then, the control unit 101 reads a program from the non-volatile memory (the EEPROM), and based on the read program, executes various processes, thereby controlling the blocks of the image capturing apparatus 100 or controlling the transfer of data between the blocks. Further, according to an operation signal from an operation unit 102 that receives an operation of a user, the control unit 101 controls the blocks of the image capturing apparatus 100. Furthermore, the control unit 101 analyzes an image obtained by an image processing unit 111, and based on the analysis result of the image, controls the blocks of the image capturing apparatus 100.

The operation unit 102 includes switches with which to input various operations related to image capturing, such as a power button, shutter buttons (SW1 and SW2), a moving image recording start button, a zoom adjustment button, and an autofocus button. Further, the operation unit 102 includes a menu display button, a determination button, a cursor key, a pointing device, and a touch panel. If the user operates any of these keys and buttons, the operation unit 102 transmits an operation signal to the control unit 101.

Further, a bus 103 is a general-purpose bus for sending various types of data, a control signal, and an instruction signal to the blocks of the image capturing apparatus 100.

A non-volatile memory 105 is an electrically erasable and recordable memory and stores a constant and a program for the operation of the control unit 101.

An image capturing unit 110 converts, by controlling the amount of light using a diaphragm, an optical image of an object captured by a lens into an image signal using an image sensor such as a charge-coupled device (CCD) sensor or a complementary metal-oxide-semiconductor (CMOS) sensor, performs analog-to-digital conversion on the image signal, and transmits the digital image signal to the image processing unit 111.

The image processing unit 111 performs an image quality adjustment process for adjusting the white balance, the color, or the brightness of the input digital image signal based on setting values. Then, the image signal processed by the image processing unit 111 is transmitted to a memory 104, a video output unit 150, or a display control unit 131 by the control unit 101.

In the present exemplary embodiment, for example, the image capturing unit 110 has an "optical zoom" function and an "optical image stabilization" function. The image processing unit 111 has an "electronic zoom" function and an "electronic image stabilization" function. Each of the "optical zoom" function and the "electronic zoom" function is the function of enlarging an obtained image according to an operation of the user. Further, each of the "optical image stabilization" function and the "electronic image stabilization" function is the function of preventing an image from shaking by the vibration of the main body of the image capturing apparatus 100. Then, under control of the control unit 101, these functions are simultaneously used, alternately used, or independently used.

The "optical zoom" function is the function of, according to an operation of the user on a zoom key of the operation unit 102, moving the lens of the image capturing unit 110, thereby enlarging or reducing an optical image of a captured object. Further, the "electronic zoom" function is the process in which, according to an operation of the user on the zoom key of the operation unit 102, the image processing unit 111 generates an image signal by enlarging an image obtained by clipping a part of an image generated by the image capturing unit 110. Furthermore, the "optical image stabilization" function is the function of, based on the value of an acceleration signal from a vibration detection unit (not illustrated), calculating the amount of movement of the lens and moving the lens, thereby preventing an acquired image from shaking. Further, the "electronic image stabilization" function is the function of, based on the value of an acceleration signal from the vibration detection unit (not illustrated), adjusting the position of an image signal acquired by the image capturing unit 110, thereby preventing an image from shaking. Furthermore, the "electronic image stabilization" function can also be achieved by, based on the value of an acceleration signal from the vibration detection unit (not illustrated), shifting the reading position of the image sensor of the image capturing unit 110. These functions are known techniques, and therefore are not described in detail.

A sound input unit 120 collects (picks up) a sound around the image capturing apparatus 100, for example, using a non-directional microphone built into the image capturing apparatus 100 or an external microphone connected to the image capturing apparatus 100 via a sound input terminal, performs analog-to-digital conversion on the collected sound, and transmits the digital sound to a sound processing unit 121. The sound processing unit 121 performs processing regarding the sound, such as the process of making the level of the input digital sound signal appropriate. Then, the sound signal processed by the sound processing unit 121 is transmitted to the memory 104 by the control unit 101. The memory 104 temporarily stores the image signal and the sound signal obtained by the image processing unit 111 and the sound processing unit 121, respectively.

The image processing unit 111 and the sound processing unit 121 read the image signal and the sound signal temporarily stored in the memory 104 and encode the image signal and the sound signal, thereby generating a compressed image signal and a compressed sound signal, respectively. The control unit 101 transmits the compressed image signal and the compressed sound signal to a recording/reproduction unit 140.

The recording/reproduction unit 140 records in a recording medium 141 the compressed image signal and the compressed sound signal generated by the image processing unit 111 and the sound processing unit 121, respectively, and also control data regarding image capturing. Further, in a case where the sound signal is not encoded by compression, the control unit 101 transmits the sound signal generated by the sound processing unit 121 and the compressed image signal generated by the image processing unit 111 to the recording/reproduction unit 140 and causes the recording/reproduction unit 140 to record the sound signal and the compressed image signal in the recording medium 141.

The recording medium 141 may be a recording medium built into the image capturing apparatus 100 or may be a removable recording medium. The recording medium 141 can record the compressed image signal, the compressed sound signal, and the sound signal generated by the image capturing apparatus 100, and various types of data including background music (BGM) data described below. As the recording medium 141, a medium having a larger capacity than the non-volatile memory 105 is generally used. Examples of the recording medium 141 include recording media using various methods, such as a hard disk, an optical disc, a magneto-optical disc, a compact disc Recordable (CD-R), a digital versatile disc recordable (DVD-R), a magnetic tape, a non-volatile semiconductor memory, and a flash memory.

Further, the recording/reproduction unit 140 reads (reproduces) the compressed image signal, the compressed sound signal, the sound signal, the various types of data, and a program recorded in the recording medium 141. Then, the control unit 101 transmits the read compressed image signal and compressed sound signal to the image processing unit 111 and the sound processing unit 121, respectively. The image processing unit 111 and the sound processing unit 121 store the compressed image signal and the compressed sound signal temporarily in the memory 104, decode the compressed image signal and the compressed sound signal by a predetermined procedure, and transmit the decoded image signal to the video output unit 150 or the display control unit 131 and the decoded sound signal to a sound output unit 151, respectively. Further, in a case where the sound signal is recorded without being compressed in the recording medium 141, the control unit 101 directly transmits the sound signal to the sound output unit 151.

The sound output unit 151 includes, for example, a sound output terminal and transmits a sound signal to output a sound from an earphone or a loudspeaker connected to the image capturing apparatus 100. Alternatively, the sound output unit 151 may be a loudspeaker that is built into the image capturing apparatus 100 and outputs a sound regarding a sound signal. The video output unit 150 includes, for example, a video output terminal and transmits an image signal to display a video on an external display connected to the image capturing apparatus 100. Alternatively, the sound output unit 151 and the video output unit 150 may be a single integrated terminal such as a High-Definition Multimedia Interface (HDMI) (registered trademark) terminal.

Further, the display control unit 131 displays on a display unit 130 a video based on the image signal transmitted from the image processing unit III, and an operation screen (a menu screen) for operating the image capturing apparatus 100. The display unit 130 may be any display device such as a liquid crystal display, an organic electroluminescent (EL) display, or electronic paper.

A communication unit 152 performs communication between the image capturing apparatus 100 and an external apparatus, and transmits or receives, for example, data of a sound signal, an image signal, a compressed sound signal, and a compressed image signal. Further, the communication unit 152 transmits or receives a control signal regarding image capturing, such as a command to start or end image capturing, or other information. The communication unit 152 is a wireless communication module such as an infrared communication module, a Bluetooth (registered trademark) communication module, a wireless local area network (LAN) communication module, a wireless universal serial bus (USB) module, or a global positioning system (GPS) receiver.

The normal operation of the image capturing apparatus 100 according to the present exemplary embodiment is described.

In the image capturing apparatus 100 according to the present exemplary embodiment, if the user operates the power button of the operation unit 102, the operation unit 102 instructs the control unit 101 to start. Receiving the instruction, the control unit 101 controls a power supply unit (not illustrated) to supply power to the blocks of the image capturing apparatus 100.

If power is supplied, then, for example, based on an instruction signal from the operation unit 102, the control unit 101 confirms which of, for example, a still image capturing mode, a moving image capturing mode, and a reproduction mode a mode change switch of the operation unit 102 indicates.

In the still image capturing mode, the user operates a still image recording button of the operation unit 102 in an image capturing standby state, whereby the image capturing apparatus 100 captures an image, and a compressed image signal is recorded in the recording medium 141. Then, the image capturing apparatus 100 enters the image capturing standby state again. In the moving image capturing mode, the user operates a moving image recording start button of the operation unit 102 in the image capturing standby state, whereby the image capturing apparatus 100 starts capturing an image, and meanwhile, a compressed image signal and a compressed sound signal or a sound signal are recorded in the recording medium 141. Then, the user operates a moving image recording end button of the operation unit 102, whereby the image capturing apparatus 100 ends the capturing of the image and enters the image capturing standby state again. In the reproduction mode, the image capturing apparatus 100 reproduces from the recording medium 141 a compressed image signal and a compressed sound signal or a sound signal regarding a file selected by the user, outputs a sound signal from the sound output unit 151, and displays a video on the display unit 130.

With reference to flowcharts in FIGS. 2, 5, 6, 7, 8, 9, 11, and 12, various processes performed by the image capturing apparatus 100 will be described below. The processing of these flowcharts is executed by the control unit 101 based on a program read from the non-volatile memo 105 by the control unit 101.

Figure 2:
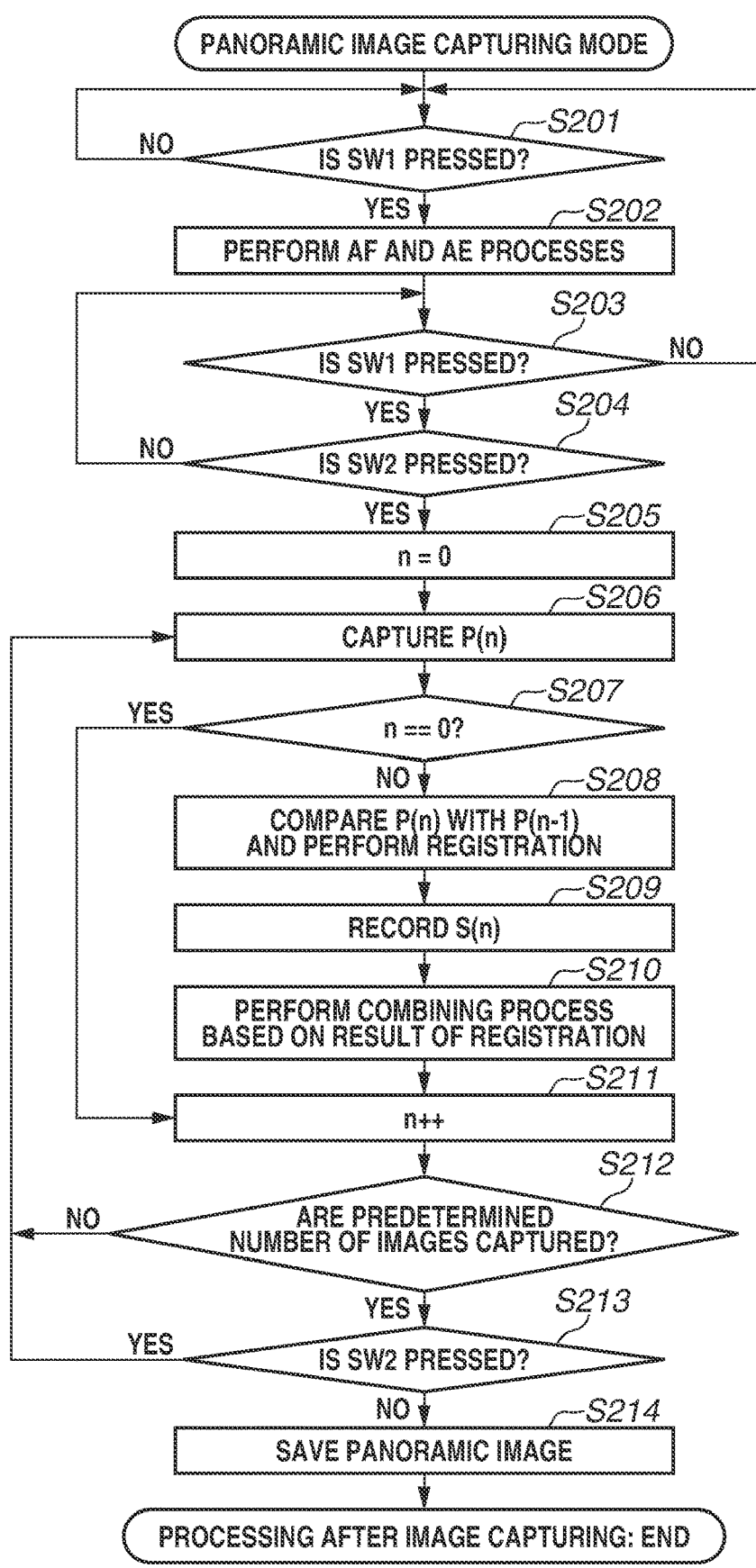
FIG. 2 is a flowchart illustrating a panoramic image capturing mode.

FIG. 2 is a flowchart illustrating a panoramic image capturing process in a panoramic image capturing mode.

In the image capturing apparatus 100, by switching the mode change switch included in the operation unit 102, the user can select a panoramic image capturing mode for recording a panoramic image by moving the image capturing apparatus 100 from left to right while continuing to press the shutter button SW2. Although in the present exemplary embodiment, the image capturing apparatus 100 is moved from left to right, the image capturing apparatus 100 may be moved from right to left or moved up and down, thereby capturing an image.

Figure 3:
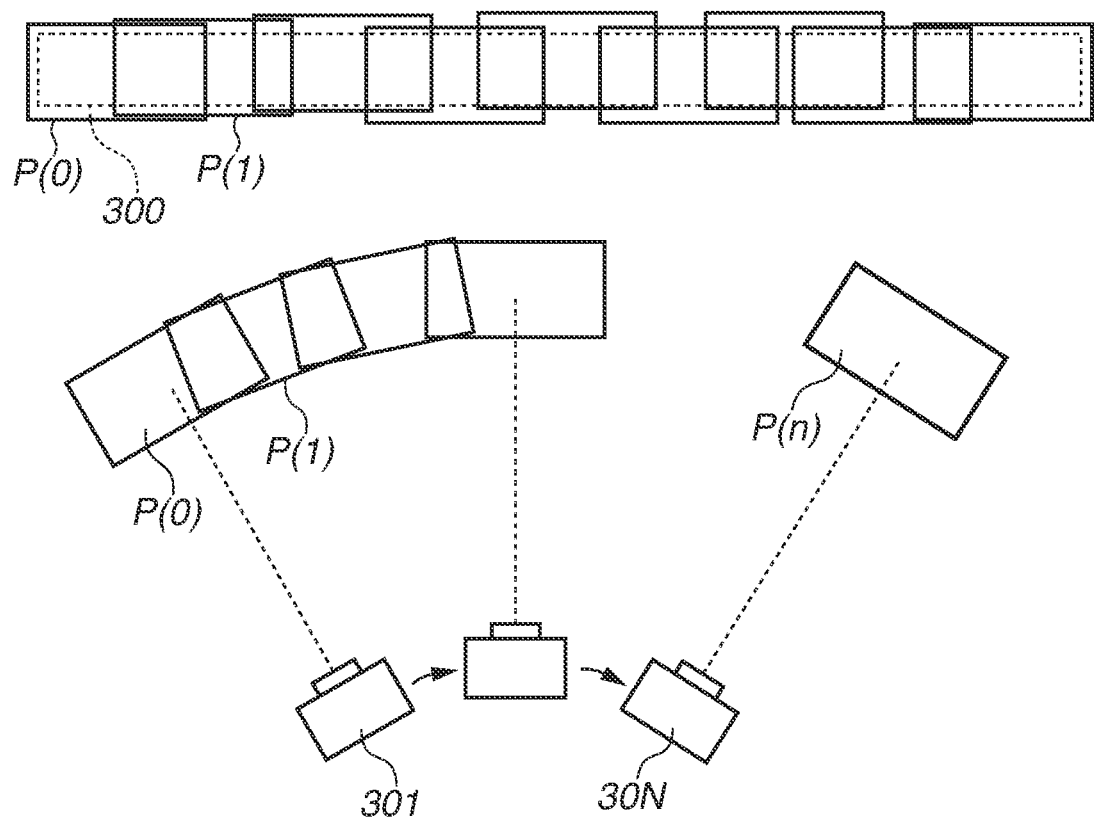
FIG. 3 is a diagram illustrating relationships between a motion of the digital camera and captured images when a panoramic image is captured.

Further, FIG. 3 illustrates the operation of the image capturing apparatus 100 in the panoramic image capturing mode.

In the panoramic image capturing mode, as in FIG. 3, images are continuously captured while the image capturing apparatus 100 is moved to the right from a state 301 to a state 30N. The images captured at this time are images P(0) to P(n). Registration is performed between the images P(n) and P(n−1), which are current and previous images among the plurality of continuously captured images, and the images P(n) and P(n−1) continue to be connected together, whereby a panoramic image 300 can be ultimately recorded.

In the panoramic image capturing mode, in step S201, the control unit 101 confirms whether the shutter button SW1 is pressed. If the shutter button SW1 is pressed (YES in step S201), the processing proceeds to step S202. If not (NO in step S201), the processing returns to step S201.

If the shutter button SW1 is pressed (YES in step S201), then in step S202, the control unit 101 instructs the blocks to execute an autofocus (AF) process, an automatic exposure (AE) process, an automatic white balance (AWB) process, and a pre-flash (EF) process.

In step S203, the control unit 101 confirms whether the shutter button SW1 is being pressed. If the shutter button SW1 is being pressed (YES in step S203), the processing proceeds to step S204. If not (NO in step S203), the processing returns to step S201.

In step S204, the control unit 101 confirms whether the shutter button SW2 is pressed. If the shutter button SW2 is pressed (YES in step S204), the processing proceeds to step S205. If not (NO in step S204), the processing returns to step S203.

In step S205, the control unit 101 initializes a variable n indicating the number of times an image is captured when a single panoramic image is captured in the panoramic image capturing mode.

In step S206, the control unit 101 performs an image capturing process. The control unit 101 performs image processing on an image P(n) obtained from the image capturing unit 110, using the image processing unit 111 and then stores the image P(n) in the memory 104.

In step S207, the control unit 101 compares n with 0, thereby determining whether n is 0. If n is 0 (YES in step S207), the processing proceeds to step S211. If not (NO in step S207), the processing proceeds to step S208. In this case, on the assumption that n is 0, the processing proceeds to step S211.

In step S211, the control unit 101 adds 1 to the variable n indicating the number of captured images.

In step S212, the control unit 101 confirms whether n reaches a predetermined number. If n reaches the predetermined number (YES in step S212), the processing proceeds to step S213. If not (NO in step S212), the processing returns to step S206. The predetermined number is the maximum number of times an image can be captured when a single panoramic image is captured. The predetermined number is set in advance based on the recording size or the capacity of a memory.

In step S213, the control unit 101 confirms whether the shutter button SW2 continues to be pressed. If the shutter button SW2 continues to be pressed (YES in step S213), the processing proceeds to step S206. If not (NO in step S213), the processing proceeds to step S214.

Next, the processes of steps S208 to S210, which are performed if n is 1 or more in step S207 will be described.

In step S208, the image processing unit 111 performs a registration process on the newest captured image P(n) and an image P(n−1) captured one time before the newest captured image P(n) that are stored in the memory 104.

Figure 4A:
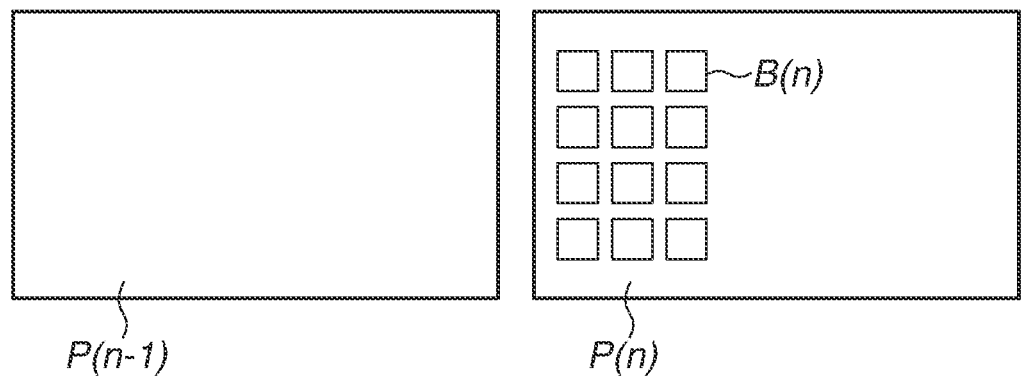
FIGS. 4A, 4B, and 4C are diagrams illustrating combining of images when the panoramic image is captured.
Figure 4B:
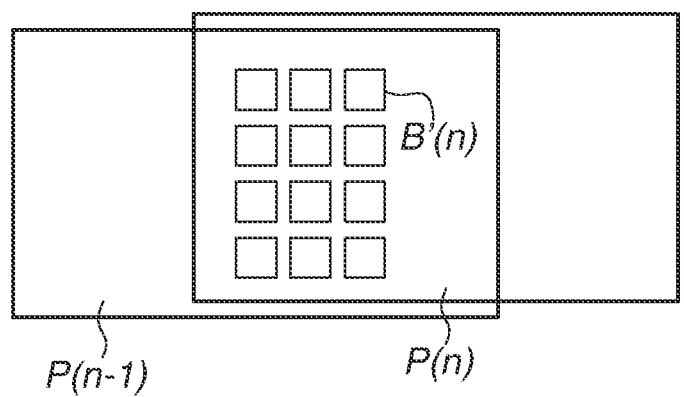
Figure 4C:
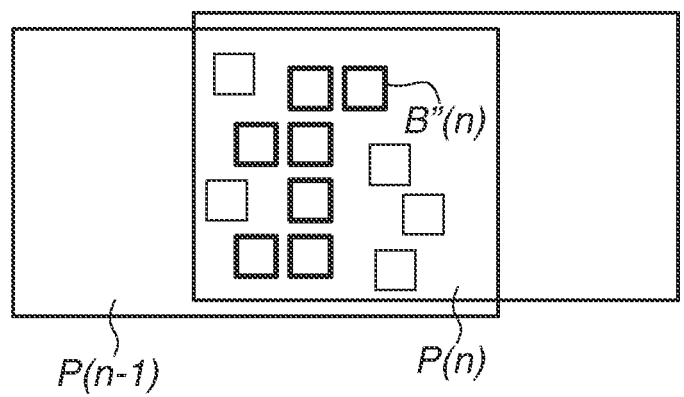

FIGS. 4A, 4B, and 4C illustrate an example of the registration process. First, in the registration process, 12 blocks B(n) (n=0 to 11) are set on the newly captured image P(n). The blocks B(n) are set on an area on an end portion side in a direction opposite to the moving direction of the camera when a panoramic image is captured, so as to include an area overlapping the image P(n−1). That is, since the panoramic image is captured by moving the camera from left to right in the present exemplary embodiment, the blocks B(n) are set on the left area of the image P(n). Then, the control unit 101 performs a search, thereby determining to which position on the previously captured image P(n−1) the area of each block B(n) corresponds (hereinafter referred to as a "corresponding block position").

As a method for determining the corresponding block position, a method for determining as the corresponding block position a portion where the difference in high-frequency component from a pixel in the area of the block is the smallest, or a method for determining as the corresponding block position a portion where the sum of the absolute differences between pixels is the smallest is used.

FIG. 4B illustrates an ideal search result B'(n) of the corresponding block positions. FIG. 4B illustrates an ideal search result, in which, as the positional relationships between the blocks, the blocks are arranged at equal distances like the positional relationships between the blocks on the image P(n). Generally, however, an ideal shape is not obtained because an object is moving while the panoramic image is captured, or the random noise of the image capturing apparatus 100 influences the image capturing.

FIG. 4C illustrates an actual search result B"(n) of the corresponding block positions. In such a case, positioning is performed by excluding a portion where the relative position is greatly shifted and using only blocks indicated by thick lines, where the positional relationships are not shifted.

In step S209, the control unit 101 stores the number of blocks where the relative positional relationships are not shifted among the blocks searched in step S208, as combining reliability in the memory 104. That is, the combining reliability refers to the number of blocks where, in a case where the degree of similarity between two images to be combined together in the combining portion is calculated by performing pattern matching with respect to each block, the degree of similarity is greater than or equal to a predetermined value, and which are to be used for positioning when the images are combined together. It can be determined that the greater the number of blocks where the positional relationships are not shifted and which are used for positioning, the more correctly the images are connected together. Thus, the number of blocks which are to be used for positioning when the images are combined together and where the positional relationships are not shifted can be considered as a numerical value indicating with what accuracy a combining process is correctly performed.

In step S210, the control unit 101 combines the images based on the result of the registration in step S208 and stores the combined image as an image P(n−1) in the memory 104.

If it is determined in step S213 that the shutter button SW2 is off (NO in step S213), then in step S214, the control unit 101 records the image thus obtained and stored in the memory 104, as a Joint Photographic Experts Group (JPEG) image in the external recording medium 141. The information regarding the combining reliability obtained in step S209 is also recorded as image information (attribute information) together with the image.

As described above, a panoramic image is captured.

Figure 5:
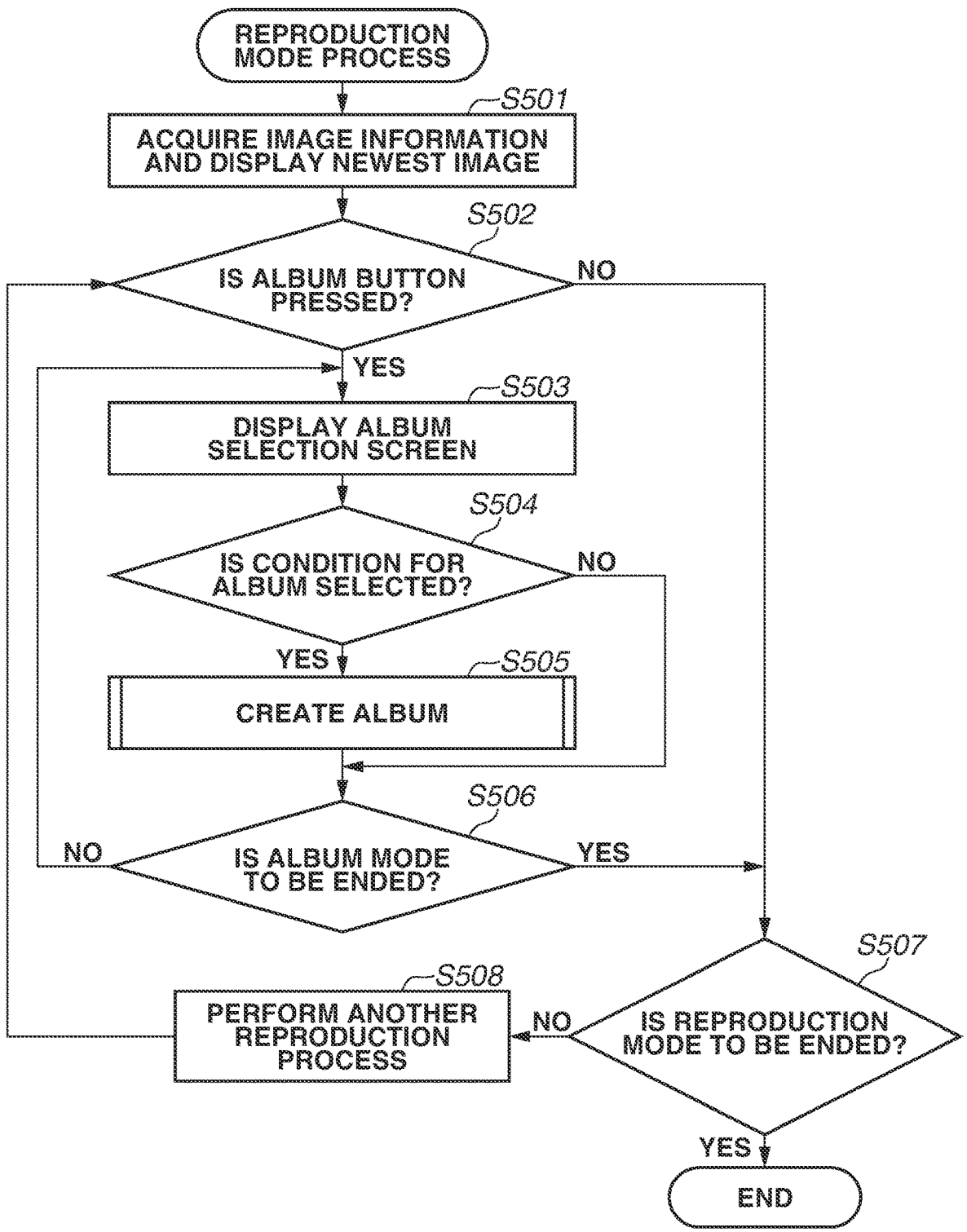
FIG. 5 is a flowchart illustrating a reproduction mode.

Next, with reference to FIG. 5, a reproduction mode process will be described.

In step S501, the control unit 101 acquires, from the recording medium 141, image information regarding an image recorded in the recording medium 141 and stores the acquired image information in the memory 104. Then, the control unit 101 reads the newest image from the recording medium 141 and displays the newest image on the display unit 130, and the processing proceeds to step S502.

In step S502, the control unit 101 determines whether an album button of the operation unit 102 is pressed. If it is determined that the album button is pressed (YES in step S502), the processing proceeds to step S503. If it is determined that the album button is not pressed (NO in step S502) the processing proceeds to step S507.

Figure 13:
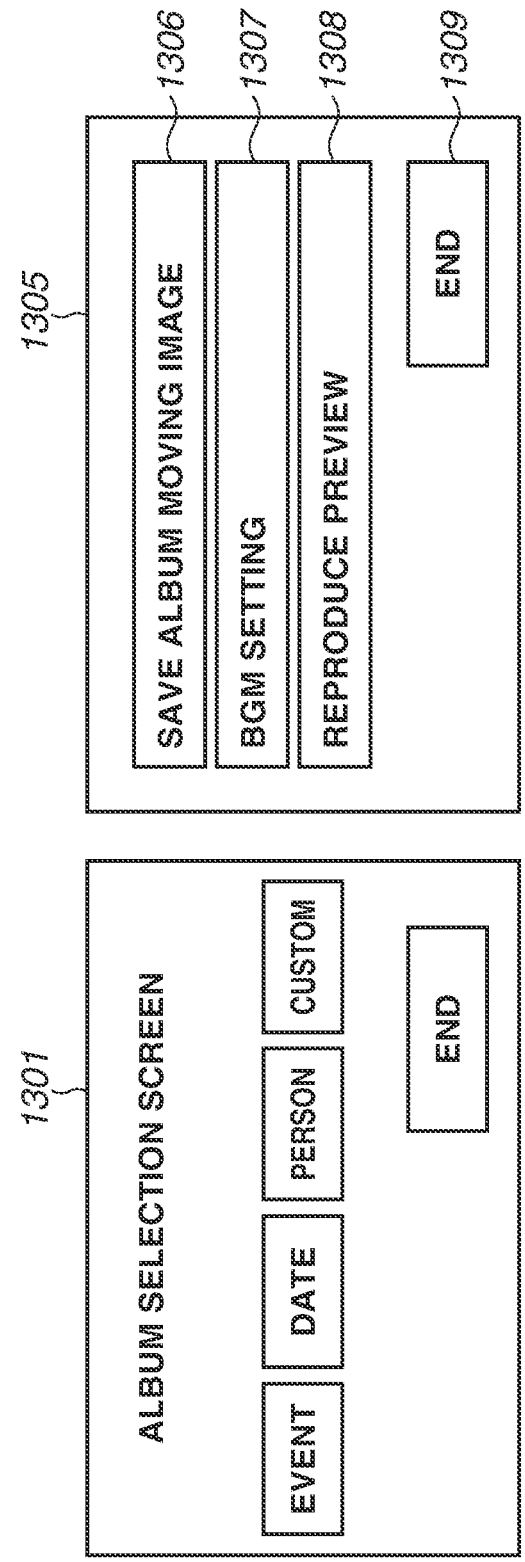
FIG. 13 is examples of screens of menu display regarding creation of an album.

In step S503, the control unit 101 displays an album selection screen 1301 as illustrated in FIG. 13. On the album selection screen 1301, the user selects one of four album selection icons, namely "event", "date", "person", and "custom", and thereby can select a condition for an image as a reproduction target of an album. If "event" is selected, an image captured in several days from the image capturing date of the image that is currently being displayed on the display unit 130 is a selection condition for an album reproduction target image. If "date" is selected, an image of the same image capturing date as the image that is currently being displayed on the display unit 130 is a selection condition for an album reproduction target image. If "person" is selected, a person is detected from the image that is currently being displayed on the display unit 130, and an image including a person that is the same as the detected person or an image including a person related to the detected person is a selection condition for an album reproduction target image. If "custom" is selected, the user is allowed to select a date, an image, or a person, and a selection condition for an album reproduction target image is determined based on the selected date, image, or person.

In the present exemplary embodiment, an album target image that can be a target of an album is a still image or a moving image recorded by the image capturing apparatus 100. Thus, using the image information acquired in step S501, the control unit 101 may determine in advance whether an album target image is present. If it is determined that an album target image is not present, the album selection icons on the album selection screen 1301 may be displayed in a gray-out manner. If the number of album target images of the same image capturing date as the image that is currently being displayed is smaller than a predetermined number, the "date" icon may be grayed out. If the number of album target images including a person included in the image that is currently being displayed is smaller than a predetermined number, the "person" icon may be grayed out.

In step S504, using the operation unit 102, the control unit 101 determines whether an album to be created is selected on the album selection screen 1301. If the album is selected (YES in step S504), the processing proceeds to step S505. If the album is not selected (NO in step S504), the processing proceeds to step S506.

In step S505, the control unit 101 creates the album, and the processing proceeds to step S506. The album creation process will be described with reference to FIG. 6.

In step S506, the control unit 101 determines whether "end" is selected on the album selection screen 1301, i.e., whether an album mode is to be ended. If the album mode is to be ended (YES in step S506), the processing proceeds to step S507. If the album mode is not to be ended (NO in step S506), the processing proceeds to step S503.

In step S507, the control unit 101 receives the operation of ending the reproduction mode from the user and determines whether the reproduction mode is to be ended. If the reproduction mode is to be ended (YES in step S507), the reproduction mode ends. If the reproduction mode is not to be ended (NO in step S507), the processing proceeds to step S508.

In step S508, the control unit 101 performs another reproduction process that the control unit 101 is instructed to perform by the operation unit 102, and the processing proceeds to step S502. Examples of another process include an image advancement process for switching an image to be displayed on the display unit 130, a process for reproducing a moving image, the erasure of an image, the editing of an image, and the transmission of an image.

As described above, the reproduction mode process is performed.

Figure 6:
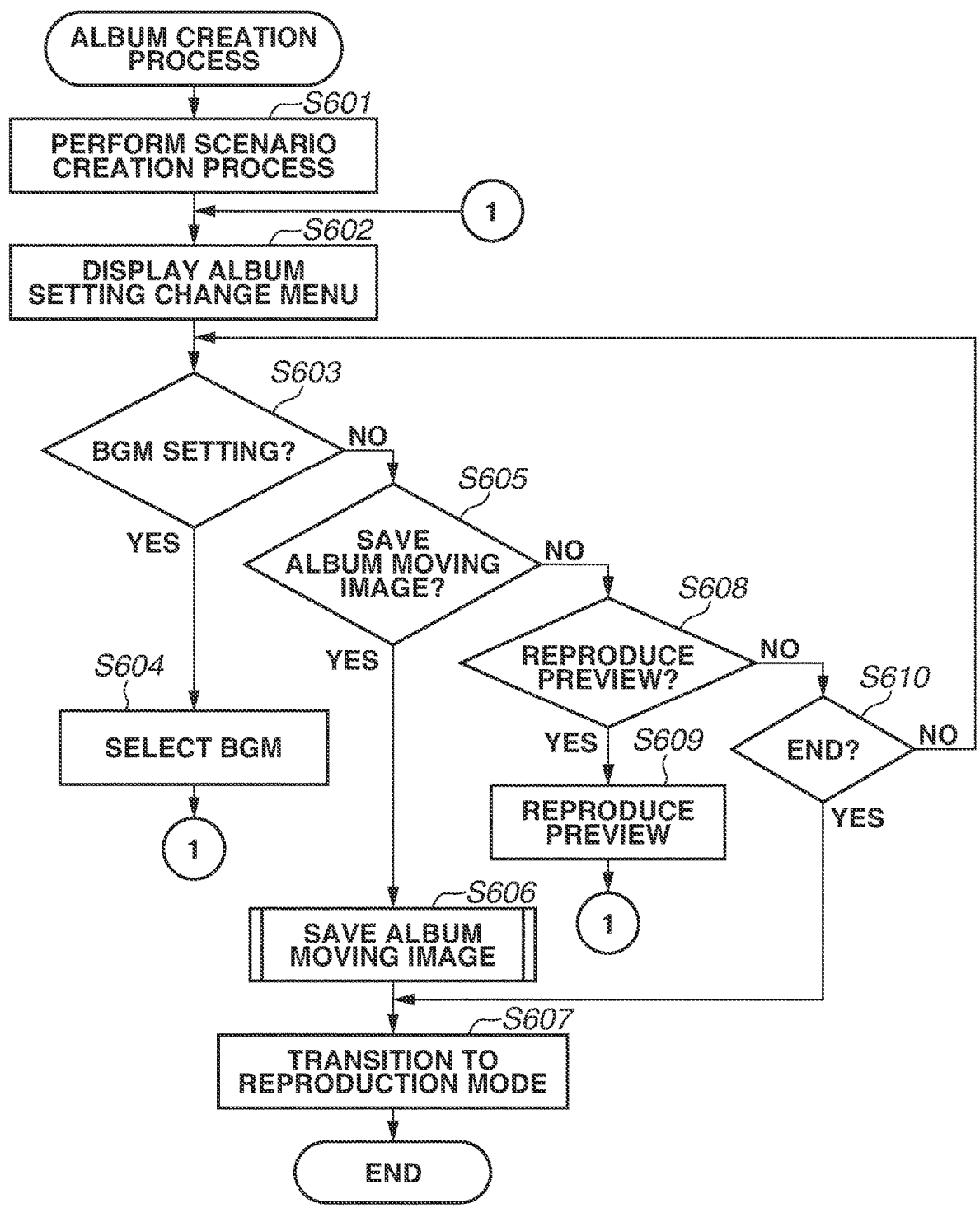
FIG. 6 is a flowchart illustrating an album creation process.

Next, with reference to FIG. 6, the album creation process executed in step S505 will be described.

In step S601, the control unit 101 performs a scenario creation process using an album target image loaded into the memory 104 and records the created scenario in the memory 104. In the scenario creation process, first, the control unit 101 singles out a still image and a moving image to be used for an album moving image. As described above, in a case where the album moving image is created based on "date", an image captured on the date is singled out. In a case where the album moving image is created based on "person", an image regarding which image information records the fact that the person is captured as an object is singled out. In a case where the album moving image is created based on "event", an image captured in several days from the image capturing date of the displayed image is singled out. Then, in a case where the user selects "custom" for creating the album moving image, an image selected by the user is set as a singled-out image.

If the singling out of images is completed, the control unit 101 determines the reproduction order (display order) of the images singled out as the album and creates a scenario as in FIG. 15. In the scenario, with respect to each image as a reproduction target, a scene number 1501, file information 1502, a chapter 1503, the number of frames 1504, vertical and horizontal sizes 1505, and a panoramic image flag 1506 are described in the reproduction order. The scene number 1501 indicates the place of the image in the reproduction order and starts from 1. As the file information 1502, information for identifying the image as the reproduction target is described, and the file path of the image is recorded in the present exemplary embodiment, instead of the file path, a handle or an identification (ID) enabling identification of the image may be recorded as the file information 1502. As the chapter 1503, in a case where the image as the reproduction target is a moving image, the number of a chapter as a reproduction target is described. In a case where the image as the reproduction target is a still image, the chapter 1503 is not described. As described above, in the case of a moving image, not the entirety of the moving image but each chapter is specified as a reproduction target. As the number of frames 1504, the number of frames when the image is reproduced is described. In a case where a chapter of a moving image is specified as a reproduction target, the number of frames of the specified chapter is recorded in the number of frames 1504. In the case of a still image, the number of frames 1504 is 60 for a normal image and 120 for a panoramic image. In the present exemplary embodiment, an album moving image is reproduced and recorded at a frame rate of 30 fps. That is, a normal still image is reproduced for two seconds, and a panoramic image is reproduced for four seconds. As the vertical and horizontal sizes 1505, the vertical and horizontal sizes of the image as the reproduction target are described. As the panoramic image flag 1506, information indicating whether the image as the reproduction target is a panoramic image is described. Such a scenario is created, whereby it is possible to specify the place of the image as the reproduction target in the reproduction order and the reproduction time of the image as the reproduction target, and specify a chapter as a reproduction target in the case of a moving image. Further, in addition to these pieces of information, information regarding a BGM setting and information regarding the number of frames of the entirety of the scenario are also recorded as information regarding the entirety of the scenario.

In step S602, the control unit 101 displays an album setting change menu 1305 in FIG. 13 on the display unit 130.

In steps S603, S605, S608, and S610, the control unit 101 monitors an operation on the operation unit 102 in the album setting change menu 1305 and determines whether any of "save album moving image" 1306, "BGM setting" 1307, "reproduce preview" 1308, and "end" 1309 is selected. The processes of steps S603, S605, S608, and S610 are repeated until any of these icons is selected. If it is determined in step S603 that "BGM setting" 1307 is selected (YES in step S603), the processing proceeds to step S604.

In step S604, the control unit 101 makes a BGM setting. The control unit 101 selects BGM to be combined with the album moving image from a plurality of pieces of BGM recorded in advance in the recording medium 141 of the image capturing apparatus 100 and selects the sound combining rate of mixing the sound of the moving image with the BGM. The control unit 101 records the set content in the scenario, and then, the processing returns to step S603. At this time, the control unit 101 also records auxiliary information regarding the BGM setting in the scenario. As the auxiliary information regarding the BGM, information indicating what kind of musical composition, such as a slow musical composition or a fast tempo musical composition, the BGM is, the reproduction time of the musical composition, and the sound combining rate are set.

If it is determined in step S605 that "save album moving image" 1306 is selected (YES in step S605), the processing proceeds to step S606.

In step S606, based on the scenario created in step S601, the control unit 101 saves the album moving image. The album moving image saving process will be described in FIG. 7. If the saving of the album moving image is completed, then in step S607, the control unit 101 performs control to transition to the reproduction mode, and the album creation process ends.

If it is determined in step S608 that the "reproduce preview" 1308 is selected (YES in step S608), the processing proceeds to step S609. In step S609, based on the scenario, the control unit 101 reproduces the album moving image.

If it is determined in step S610 that "end" 1309 is selected (YES in step S610), then in step S607, the control unit 101 performs control to transition to the reproduction mode, and the album creation process ends.

Figure 7:
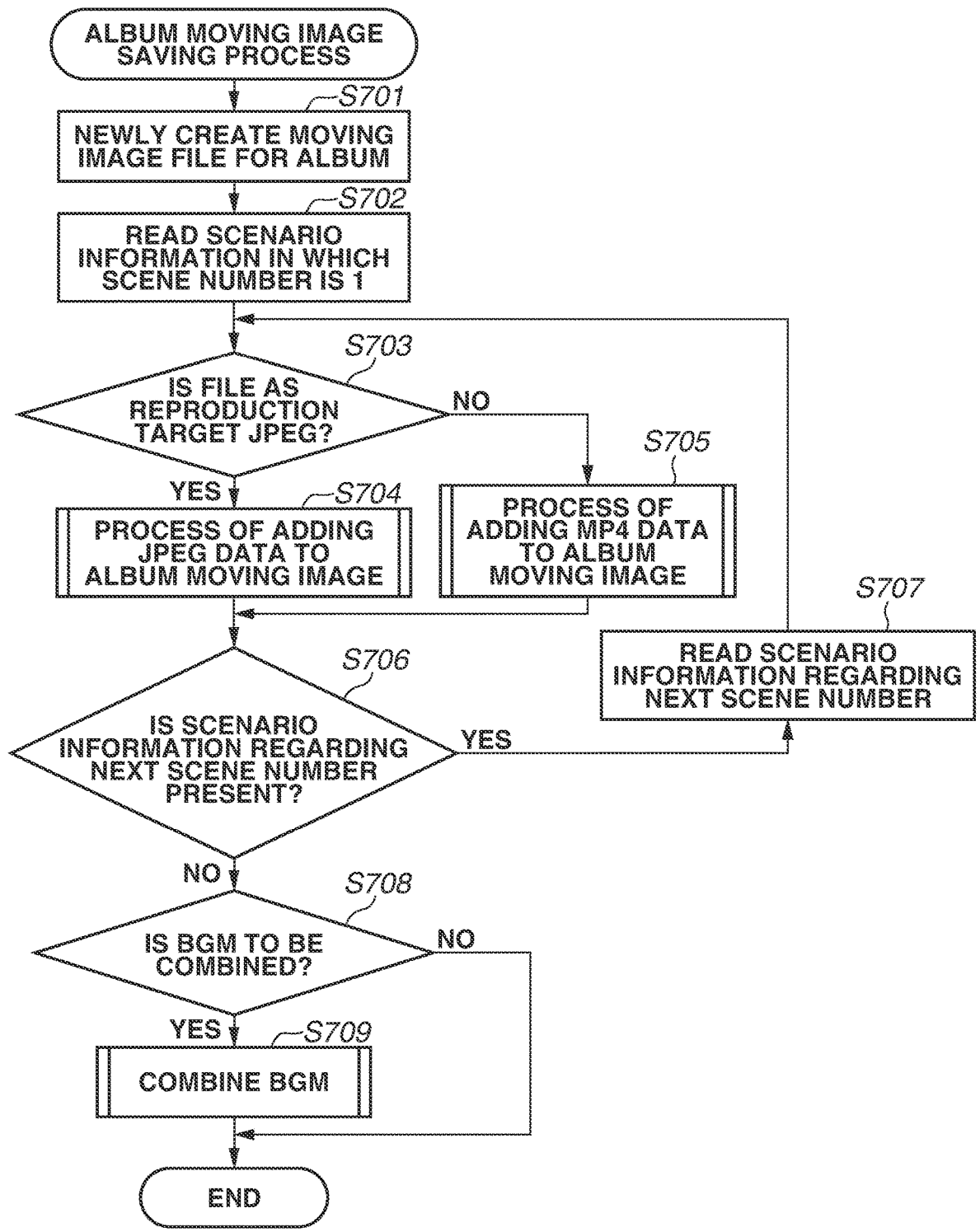
FIG. 7 is a flowchart illustrating an album moving image saving process.

Next, with reference to FIG. 7, the album moving image saving process will be described.

First, in step S701, the control unit 101 newly creates a moving image file for the album moving image and causes the recording/reproduction unit 140 to record the new moving image file in the recording medium 141.

In step S702, the control unit 101 reads, from the scenario created and recorded in the memory 104 in step S601, scenario information in which the scene number is 1. Then, based on the scenario information regarding the read scene number, the processes of steps S703 to S706 are executed.

In step S703, the control unit 101 identifies an image file as a reproduction target from the file information 1502 described in the scenario information and determines whether the image file as the reproduction target is a JPEG (still image) file or a Moving Picture Experts Group (MPEG)-4 Part 14 (MP4) (moving image) file. If the image file as the reproduction target is a JPEG file (YES in step S703), the processing proceeds to step S704. If not (NO in step S703), the image file as the reproduction target is an MP4 file of a moving image, and therefore, the processing proceeds to step S705.

In step S704, the control unit 101 executes the process of, regarding the JPEG file as the reproduction target identified from the file information 1502 described in the scenario information, adding data of the JPEG file to the file for the album moving image, and the processing proceeds to step S706. The process of adding the data of the JPEG file to the file for the album moving image will be described in detail with reference to FIG. 8.

In step S705, the control unit 101 executes the process of, regarding the MP4 file as the reproduction target identified from the file information 1502 described in the scenario information, adding data of the MP4 file to the file for the album moving image, and the processing proceeds to step S706. The process of adding the data of the MP4 file to the file for the album moving image will be described in detail with reference to FIG. 11.

In the present exemplary embodiment, image data (a still image and a moving image) specified as a reproduction target in a scenario is sequentially added to a file for an album moving image, thereby generating album moving image data. Alternatively, pieces of moving image data may be generated from image data specified as a reproduction target in a scenario, and the generated moving images may be connected together, thereby creating an album moving image file.

In step S706, the control unit 101 determines whether scenario information regarding the next scene number is present in the scenario recorded in the memory 104. If it is determined that scenario information regarding the next scene number is present (YES in step S706), then in step S707, the control unit 101 reads the scenario information regarding the next scene number and executes the processes of steps S703 to S705 based on the read scenario information. The processes of steps S703 to S707 are repeated until scenario information regarding the next scene number is not present. Then, if it is determined that scenario information regarding the next scene number is not present (NO in step S706), this means that the generation of the album moving image is completed. Thus, the processing proceeds to step S708.

In step S708, based on the information regarding the setting of BGM described in the scenario created and recorded in the memory 104 in step S601, the control unit 101 determines whether BGM is to be combined. If it is determined that BGM is to be combined (YES in step S708), the processing proceeds to step S709. If it is determined that BGM is not to be combined (NO in step S708), the album moving image saving process ends.

In step S709, the control unit 101 executes a BGM combining process for combining BGM data to the MP4 file of the album moving image of which the generation is completed in step S708. Then, the album moving image saving process ends. The BGM combining process will be described in detail with reference to FIG. 12.

Figure 8:
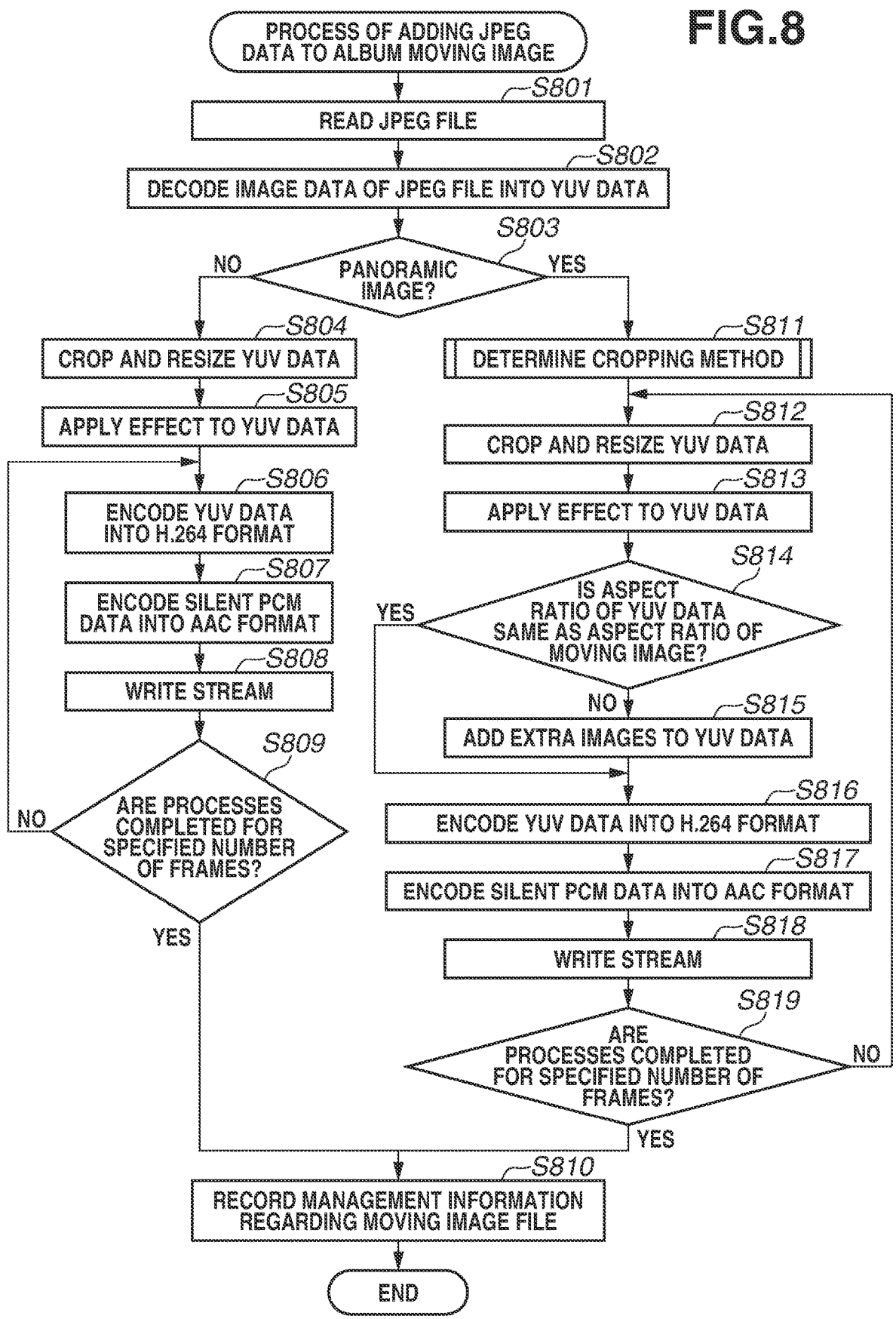
FIG. 8 is a flowchart illustrating a process of adding Joint Photographic Experts Group (JPEG) data to an album moving image.

Next, with reference to FIG. 8, the process of adding the data of the JPEG file to the file for the album moving image in step S704 will be described.

In step S801, the control unit 101 reads from the recording medium 141 the JPEG file identified from the file information 1502 and temporarily holds the read JPEG file in the memory 104.

In step S802, the control unit 101 decodes image data of the JPEG file held in the memory 104 into YUV data using the image processing unit 111 and holds the YUV data in the memory 104, and the processing proceeds to step S803.

In step S803, based on information regarding the panoramic image flag 1506, the control unit 101 determines whether the image as the reproduction target is a panoramic image. Although in the present exemplary embodiment, the information regarding the panoramic image flag 1506 is recorded in the scenario, the information regarding the panoramic image flag 1506 may not be recorded in the scenario, and based on image information described in the JPEG file, the control unit 101 may determine whether the image is a panoramic image. For example, if information regarding the image capturing mode included in the image information describes information indicating that the image is captured in the panoramic image capturing mode, the control unit 101 may determine that the image is a panoramic image. Alternatively, according to the vertical and horizontal sizes of the image, the control unit 101 may determine whether the image is a panoramic image. If it is determined that the image as the reproduction target is not a panoramic image (NO in step S803), the processing proceeds to step S804. If it is determined that the image as the reproduction target is a panoramic image (YES in step S803), the processing proceeds to step S811.

In step S804, the control unit 101 crops and resizes the YUV data held in the memory 104 in step S802, according to the image size of the album moving image using the image processing unit 111 and holds the resulting YUV data in the memory 104, and the processing proceeds to step S805. In the present exemplary embodiment, the image size of the album moving image is full high-definition (HD) (1920×1080).

In step S805, the control unit 101 applies an effect such as a color filter to the YUV data that is resized and held in the memory 104, using the image processing unit 111 and holds the resulting YUV data in the memory 104 again, and the processing proceeds to step S806.

In step S806, the control unit 101 encodes the YUV data to which the effect is applied and which is held in the memory 104, into the H.264 format using the image processing unit 111, thereby creating moving image data.

In step S807, the control unit 101 encodes silent pulse-code modulation (PCM) data into the Advanced Audio Coding (AAC) format using the sound processing unit 121, thereby generating sound data. Then, the processing proceeds to step S808.

In step S808, the control unit 101 adds stream data including the moving image data generated by encoding the YUV data in step S806 and the sound data generated by encoding the silent PCM data in step S807, to the file for the album moving image created in the recording medium 141 in step S701. At this time, the units in which to write the stream data to the recording medium 141 may be as follows. The stream data may be written with respect to each number of frames of the H.264 data or each data size of the stream data, or may be written with respect to each predetermined number of frames or each predetermined time.

In step S809, the control unit 101 determines whether the processes of steps S806 to S808 are completed for the number of frames specified by the number of frames 1504. If the processes are not completed for the specified number of frames (NO in step S809), a moving image for the period specified by the number of frames 1504 is not generated. Thus, the processes of steps S806 to S808 are repeated. Since steps S804 to S809 are processes regarding a normal still image, a moving image for 60 frames, i.e., two minutes, is generated and added to the file for the album moving image. Then, if the processes are completed for the specified number of frames (YES in step S809), then in step S810, the control unit 101 updates and records file management information regarding the moving image file for the album to which the stream is added. The control unit 101 updates the management information such that a moving image generated from a single still image is configured as a single chapter. As described above, the process of adding the moving image data generated from the still image specified by the scenario to the moving image file for the album is completed.

If, on the other hand, it is determined that the JPEG file as the reproduction target is a panoramic image (YES in step S803), then in step S811, a method for cropping the panoramic image (a still image) into a panning moving image is determined. Although the process of determining the cropping method will be described below, the process determines from which area of the panoramic image each frame of the panning moving image to be created from the panoramic image is to be cropped and created. Specifically, first, the aspect ratio of a cropping area for cropping a partial area from the panoramic image is determined. Then, based on the determined aspect ratio, vertical and horizontal sizes and the amount of movement of the cropping area are determined. The amount of movement of the cropping area is determined such that the cropping area moves from one end portion to the other end portion in the long side direction of the panoramic image. Thus, the panning moving image can be generated based on a plurality of cropped images. The following processing is performed based on the method determined by this process.

In step S812, the control unit 101 crops the area determined in step S811 from the YUV data held in the memory 104 in step S802, using the image processing unit 111 and further resizes the resulting YUV data to a size falling within the range of the image size of the album moving image. Then, the control unit 101 holds the resized YUV data in the memory 104. At this time, an album moving image generated from a single panoramic image has 120 frames (four seconds). The size of the cropping area is common to the 120 frames, but the position of the cropping area differs with respect to each frame. Thus, in step S812, the area is cropped at a position corresponding to a frame to be generated. Specifically, when data of the first frame is generated, an area at an end in the long side direction of the panoramic image is cropped. With respect to the second frame and the subsequent frames, the position of the cropping area used to generate the previous frame is stored, and the cropping area is moved by the amount of movement determined in step S811. The moving direction of the cropping area is the direction in which the cropping area moves from the end side in the long side direction of the panoramic image where the first frame is cropped, to the other end port side in the long side direction. That is, in a case where the right end is cropped in the first frame, the moving direction is from right to left. In a case where the left end is cropped in the first frame, the moving direction is from left to right. Further, in a case where the upper end is cropped in the first frame, the moving direction is from top to bottom. In a case where the lower end is cropped in the first frame, the moving direction is from bottom to top. As described above, the position of the cropping area is sequentially moved with respect to each frame to be generated. Thus, a panning moving image is generated so that images of an area of which the position in the panoramic image is moved are sequentially reproduced (sequentially displayed).

In step S813, the control unit 101 applies an effect such as a color filter to the) YUV data that is resized and held in the memory 104, using the image processing unit 111 and holds the resulting YUV data in the memory 104 again, and the processing proceeds to step S814.

In step S814, the control unit 101 determines whether the aspect ratio of the resized YUV data is 16:9, which is the same as the aspect ratio of the album moving image. Since the YUV data is resized to fall within the range of the size of the album moving image in step S812, actually, it is determined whether the vertical and horizontal sizes of the resized YUV data are the same as the size of the album moving image. If the aspect ratio of the resized YUV data is the same as the aspect ratio of the album moving image (YES in step S814), the process of step S815 is not performed, and the processing proceeds to step S816. If the aspect ratio of the resized YUV data is different from the aspect ratio of the album moving image (NO in step S814), the processing proceeds to step S815.

In step S815, the control unit 101 adds extra images (black data) for deficient sizes so that the vertical and horizontal sizes of the resized YUV data are the same as the image size of the album moving image. Then, the control unit 101 holds the resulting YUV data in the memory 104. The extra images are added equally to the left and right or above and below.

In step S816, the control unit 101 encodes the YUV data to which the effect is applied and which is held in the memory 104 (the YUV data to which the extra images are added if step S815 is executed), into the H.264 format using the image processing unit 111, thereby creating moving image data.

In step S817, the control unit 101 encodes silent PCM data into the AAC format using the sound processing unit 121, thereby generating sound data. Then, the processing proceeds to step S818.

In step S818, the control unit 101 adds stream data including the moving image data generated by encoding the YUV data in step S816 and the sound data generated by encoding the silent PCM data in step S817, to the file for the album moving image created in the recording medium 141 in step S701. At this time, the units in which to write the stream data to the recording medium 141 may be as follows. The stream data may be written with respect to each number of frames of the H.264 data or each data size of the stream data, or may be written with respect to each predetermined number of frames or each predetermined time.

In step S819, the control unit 101 determines whether the processes of steps S812 to S818 are completed for the number of frames specified by the number of frames 1504. If the processes are not completed for the specified number of frames (NO in step S819), the processes of steps S812 to S818 are repeated until a moving image for the specified period is generated. Since steps S812 to S818 are processes regarding a panoramic image, a moving image for 120 frames, i.e., four seconds, is generated and added to the file for the album moving image. Then, if the processes are completed for the specified number of frames (YES in step S819), then in step S810, the control unit 101 updates and records file management information regarding the moving image file for the album to which the stream is added. The control unit 101 updates the management information such that a moving image generated from a single still image is configured as a single chapter. As described above, the process of adding the moving image data generated from the panoramic image specified by the scenario to the moving image file for the album is completed.

The moving image data generated from a single still image created in the processes of steps S806 to S808 or the processes of steps S812 to S818 is recorded as a single chapter of the album moving image.

Next, with reference to FIGS. 9 and 10, the determination of the method for cropping the panoramic image will be described.

Figure 10:
FIG. 10 is a schematic diagram illustrating cropping of a horizontally long panoramic image.

First, with reference to FIG. 10, using a horizontally long panoramic image 1001 as an example, the setting of the aspect ratio of the cropping area and the generation of the panning moving image are described.

The panoramic image 1001 is an image having a size of 4200×900. In a case where e panoramic image 1001 is cropped in a cropping area 1011 having an aspect ratio of 16:9, which is the same as that of the album moving image, the size of the cropping area 1011 is 1600×900. At this time, when the panning moving image is generated, the cropping area is moved in the long side direction (the horizontal direction) of the panoramic image with respect to each frame. Thus, the image size in the short side direction (the vertical direction) of the panoramic image is set as the size in the vertical direction of the cropping area without change. Further, the size in the horizontal direction of the cropping area, which corresponds to the long side direction of the panoramic image, can be calculated from the image size in the short side direction of the panoramic image and the aspect ratio of the cropping area. In a case where the panoramic image 1001 is cropped in the cropping area 1011 having an aspect ratio of 16:9, the album moving image also has the same aspect ratio, i.e., 16:9. Thus, a cropped image is merely resized, whereby a frame 1012 of the album moving image can be generated.

In a case where the panoramic image 1001 is cropped in a cropping area 1021 having an aspect ratio of 20:9, the size of the cropping area 1021 is 2000×900. In this case, the aspect ratio of the album moving image is different from the aspect ratio of the cropping area 1021. Thus, a cropped image (2000×900) is resized, thereby generating an image 1023 having an aspect ratio of 1920×864. Further, extra images are added to above and below the resized image 1023, thereby generating a frame 1022 of the album moving image having an aspect ratio of 1920×1080.

Further, in a case where the panoramic image 1001 is cropped in a cropping area 1031 having an aspect ratio of 30:9, the size of the cropping area 1031 is 3000×900. In this case, the aspect ratio of the album moving image is different from the aspect ratio of the cropping area 1031. Thus, a cropped image (3000×900) is resized, thereby generating an image 1033 having an aspect ratio of 1920×576. Further, extra images are added to above and below the resized image 1033, thereby generating a frame 1032 of the album moving image having an aspect ratio of 1920×1080.

At this time, if the panoramic image 1001 is cropped with an aspect ratio of 16:9, which is the same as that of the album image, the panning moving image can be generated without adding extra images. In the present exemplary embodiment, however, the length of a panning moving image generated from a panoramic image is fixed to four seconds, which corresponds to 120 frames. Thus, in a case where the size in the long side direction of a panoramic image is very large relative to the size in the short side direction of the panoramic image, and a panning moving image to move along the entire length in the long side direction of the panoramic image is generated, the amount of movement of the cropping position between frames is large. Thus, a moving image with a fast panning speed is generated. The size in the long side direction of the image to be cropped is larger with an aspect ratio of 20:9 than with an aspect ratio of 16:9. Thus, it is possible to make the amount of movement of the cropping position between frames and the panning speed smaller in the case of an aspect ratio of 20:9 than in the case of an aspect ratio of 16:9. Further, the size in the long side direction of the image to be cropped is even larger with an aspect ratio of 30:9 than with an aspect ratio of 20:9. Thus, it is possible to make the amount of movement of the cropping position between frames and the panning speed even smaller in the case of an aspect ratio of 30:9 than in the case of an aspect ratio of 20:9.

In response, in the present exemplary embodiment, to adjust the panning speed, according to the ratio between the image sizes in the long side direction (the horizontal direction) and the short side direction (the vertical direction) of the panoramic image, or the image size in the long side direction (the horizontal direction) the panoramic image, the aspect ratio for cropping for generating the panning moving image from the panoramic image is switched.

Figure 9:
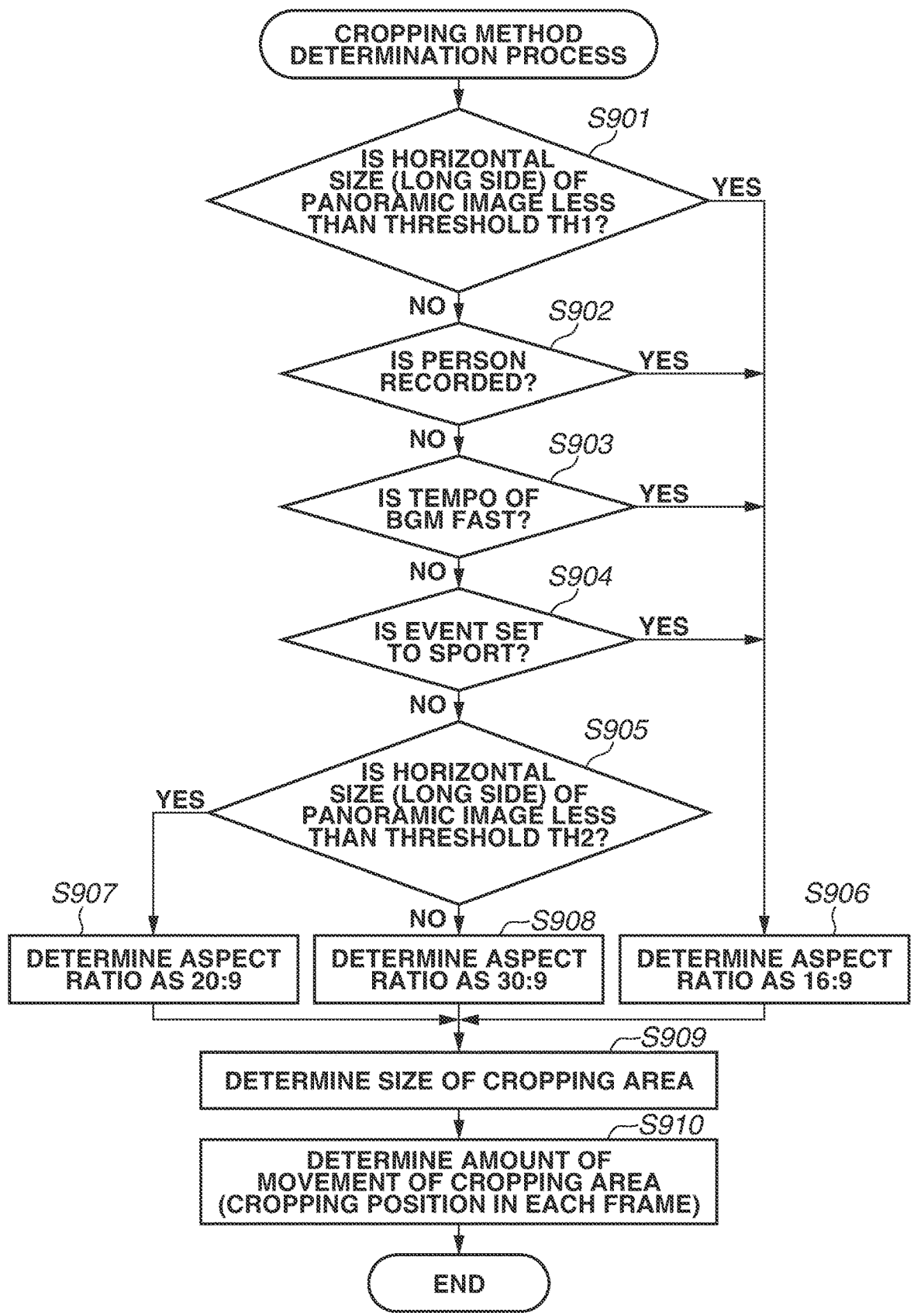
FIG. 9 is a flowchart illustrating a process of determining a method for cropping a panoramic image.

With reference to FIG. 9, the cropping method determination process in step S811 will be described.

In step S901, the control unit 101 determines whether the horizontal image size (the length of the long side) of the panoramic image is less than a threshold TH1. If the horizontal image size is less than the threshold TH1 (YES in step S901), the processing proceeds to step S906. If the horizontal image size is greater than or equal to the threshold TH1 (NO in step S901), the processing proceeds to step S902. In the present exemplary embodiment, since the panoramic image is horizontally long and the vertical image size of the panoramic image is fixed to 1080, it is determined whether the horizontal image size, which is the size of the long side, is less than the threshold TH1. If, however, the vertical image size, which is the size of the short side of the panoramic image, is variable, the horizontal (long side) image size and the horizontal (short side) image size may be acquired, and it may be determined whether a value obtained by dividing the horizontal image size by the vertical image size is less than a threshold TH10.

In step S906, since the panoramic image is not so long in the long side direction, the control unit 101 determines the aspect ratio of the cropping area for generating the panning moving image as 16:9, which is the same as the aspect ratio of the album moving image.

In step S902, the control unit 101 determines whether a person is recorded in object information included in image information regarding the panoramic image. If a person is recorded (YES in step S902), the processing proceeds to step S906. If a person is not recorded (NO in step S902), the processing proceeds to step S903. A panoramic image in which a person is recorded should be largely reproduced without adding extra images to the panoramic image even if the panning speed becomes fast. Thus, the aspect ratio of the cropping area is set to 16:9.

In step S903, based on the auxiliary information regarding the BGM described in the above scenario, the control unit 101 determines whether the tempo of the BGM is fast. If the tempo of the BGM is fast (YES in step S903), the processing proceeds to step S906. If not (NO in step S903), the processing proceeds to step S904. If the tempo of BGM is fast, and even if the panning speed becomes fast, the fast panning speed has a high affinity for the BGM. Thus, it is not necessary to slow down the panning speed. Thus, the aspect ratio of the cropping area is set to 16:9.

In step S904, the control unit 101 determines whether event information described in the above scenario indicates a sport scene. If a sport is set (YES in step S904), the processing proceeds to step S906. If not (NO in step S904), the processing proceeds to step S905.

In step S905, the control unit 101 determines whether the horizontal image size (the length of the long side) of the panoramic image is less than a threshold TH2 (> TH1). If the horizontal image size is less than the threshold TH2 (YES in step S905), the processing proceeds to step S907. If the horizontal image size is greater than or equal to the threshold TH2 (NO in step S905), the processing proceeds to step S908. Also in step S905, similarly to step S901, it may be determined whether a value obtained by dividing the horizontal image size by the vertical image size is less than a threshold TH20. In this case. TH20>TH10.

In step S907, since the panoramic image is somewhat long in the long side direction, the control unit 101 determines the aspect ratio of the cropping area for generating the panning moving image as 20:9. In step S908, since the panoramic image is very long in the long side direction, the control unit 101 determines the aspect ratio of the cropping area for generating the panning moving image as 30:9. In step S909, based on the aspect ratio of the cropping area determined in steps S906 to S908 and the image size of the panoramic image, the size of the cropping area is determined.

Then, in step S910, based on the determined size of the cropping area and the number of frames 1504 described in the scenario, the control unit 101 determines the amount of movement for sequentially moving the cropping area from one end portion to the other end portion in the long side direction of the panoramic image. In the present exemplary embodiment, the vertical and horizontal sizes of the cropping area and the amount of movement between frames are determined. Alternatively, the position of the cropping area may be individually determined with respect to each frame. As described above, based on the vertical and horizontal sizes of the panoramic image and information set in the scenario, the size of the area to be cropped and the amount of movement of the cropping area with respect to each frame are determined.

In the present exemplary embodiment, the number of frames for creating the panning moving image from the panoramic image is determined in advance as 120 frames (four seconds). Thus, if the same aspect ratio of the area to be cropped is set for a panoramic image of which the size of the long side is different, the amount of movement for moving the cropping area between frames becomes large. This results in reproducing a panoramic image long in the long side direction by panning the panoramic image at high speed. Thus, according to embodiments of the present invention, the panning speed is adjusted by appropriately changing the aspect ratio of the cropping area based on the image size in the long side direction or the ratio (the aspect ratio) between the image size in the short side direction and the image size in the long side direction. On the other hand, in a case where fast tempo BGM is set or an event is a sport, the entirety of the album moving image is configured as a dynamic speedy moving image. Thus, it is conceivable that it is appropriate to incorporate, as a moving image to be provided to the user, a panning moving image created by cropping an image to intentionally obtain a fast reproduction speed.

In FIG. 9, the method for cropping a horizontally long panoramic image has been described. Similar to a horizontally long panoramic image, the method (the size of the cropping area and the amount of movement of the cropping area) for cropping a vertically long panoramic image can also be determined using the flowchart in FIG. 9. The method for cropping a vertically long panoramic image, however, is different from the method for cropping a horizontally long panoramic image in the determination methods in steps S901 and S905 and the aspect ratios set in steps S906, S907, and S908.

The differences between the determination of the method for cropping a vertically long panoramic image and the cropping method determination process for a horizontally long panoramic image are described below. Processes other than those described below are similar to those in the cropping method determination process for a horizontally long panoramic image.

In step S901, the control unit 101 determines whether the image size in the vertical direction (the long side) of the panoramic image is less than a threshold TH3. Then, if the image size in the vertical direction is less than the threshold TH3 (YES in step S901), the processing proceeds to step S906. If the image size in the vertical direction is not less than the threshold TH3 (NO in step S901), the processing proceeds to step S902.

In step S905, the control unit 101 determines whether the image size in the vertical direction (the long side) of the panoramic image is less than a threshold TH4 (>TH3). Then, if the image size in the vertical direction is less than the threshold TH4 (YES in step S905), the processing proceeds to step S907. If the image size in the vertical direction is not less than the threshold TH4 (NO in step S905), the processing proceeds to step S908. Alternatively, in steps S901 and S905, the image size of the long side and the threshold may not be compared, and the aspect ratio and a threshold may be compared, thereby making the determination. That is, in step S901, the control unit 101 may determine whether a value obtained by dividing the vertical image size by the horizontal image size is less than a threshold TH30. In step S905, the control unit 101 may determine whether a value obtained by dividing the vertical image size by the horizontal image size is less than a threshold TH40 (>TH30).

In step S906, since the panoramic image is not so long in the long side direction, the control unit 101 sets the aspect ratio of the cropping area to 16:9, which is the same as the aspect ratio of the album moving image.

In step S907, since the panoramic image is somewhat long in the long side direction, the control unit 101 sets the aspect ratio of the cropping area for generating the panning moving image to 4:3. In step S908, since the panoramic image is very long in the long side direction, the control unit 101 sets the aspect ratio of the cropping area for generating the panning moving image to 1:1.

Figure 14:
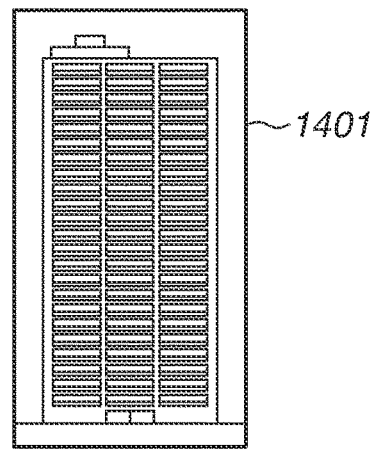
FIG. 14 is a schematic diagram illustrating cropping of a vertically long panoramic image.

With reference to FIG. 14, using a vertically long panoramic image 1401 as an example, the setting of the aspect ratio of the cropping area and the generation of the panning moving image will be described.

The panoramic image 1401 is a panoramic image long in the vertical direction and having a size of 1600×3600. In a case where the panoramic image 1401 is cropped in a cropping area 1411 having an aspect ratio of 16:9, which is the same as that of the album moving image, the size of the cropping area 1411 is 1600×900. At this time, when the panning moving image is generated, the cropping area is moved in the long side direction (the vertical direction) of the panoramic image with respect to each frame. Thus, the image size in the short side direction (the horizontal direction) of the panoramic image is set as the size in the horizontal direction of the cropping area without change. Further, the size in the vertical direction of the cropping area, which corresponds to the long side direction of the panoramic image, can be calculated from the image size in the short side direction (the horizontal direction) of the panoramic image and the aspect ratio of the cropping area. In a case where the panoramic image 1401 is cropped in the cropping area 1411 having an aspect ratio of 16:9, the album moving image also has the same aspect ratio, i.e., 16:9. Thus, a cropped image is merely resized, whereby a frame 1412 of the album moving image can be generated.

In a case where the panoramic image 1401 is cropped in a cropping area 1421 having an aspect ratio of 4:3, the size of the cropping area 1421 is 1600×1200. In this case, the aspect ratio of the album moving image is different from the aspect ratio of the cropping area 1421. Thus, a cropped image (1600×1200) is resized, thereby generating an image 1423 having an aspect ratio of 1440×1080. Further, extra images are added to the left and right of the resized image 1423, thereby generating a frame 1422 of the album moving image having an aspect ratio of 1920×1080.

Further, in a case where the panoramic image 1401 is cropped in a cropping area 1431 having an aspect ratio of 1:1, the size of the cropping area 1431 is 1600×1600. In this case, the aspect ratio of the album moving image is different from the aspect ratio of the cropping area 1431. Thus, a cropped image (1600×1600) is resized, thereby generating an image 1433 having an aspect ratio of 1080×1080. Further, extra images are added to the left and right of the resized image 1433, thereby generating a frame 1432 of the album moving image having an aspect ratio 1920×1080.

At this time, if the panoramic image 1401 is cropped with an aspect ratio of 16:9, which is the same as that of the album image, the panning moving image can be generated without adding extra images. The size in the long side direction (the vertical direction) of the image to be cropped is larger with an aspect ratio of 4:3 than with an aspect ratio of 16:9. Thus, it is possible to make the amount of movement of the cropping position between frames and the panning speed smaller in the case of an aspect ratio of 4:3 than in the case of an aspect ratio of 16:9. Furthermore, the size in the long side direction (the vertical direction) of the image to be cropped is even larger with an aspect ratio of 1:1 than with an aspect ratio of 4:3. Thus, it is possible to make the amount of movement of the cropping position between frames and the panning speed even smaller in the case of an aspect ratio of 1:1 than in the case of an aspect ratio of 4:3.

As described above, similar to a horizontally long panoramic image, the cropping method for a vertically long panoramic image can also be determined.

In the present exemplary embodiment, the image size of the album moving image to be generated is a full HD (1920×1080) size. Alternatively, a configuration may be employed in which the image size of the album moving image to be generated can be changed to another size by an operation of the user on the operation unit 102. In this case, the aspect ratio set in step S906 is the same as the aspect ratio of the album moving image of the changed size. Then, in step S907, the aspect ratio is set such that the proportion in the long side direction of the panoramic image is greater than that in the aspect ratio of the album moving image. In step S908, the aspect ratio is set such that the proportion to the long side direction is even greater.

Figure 11:
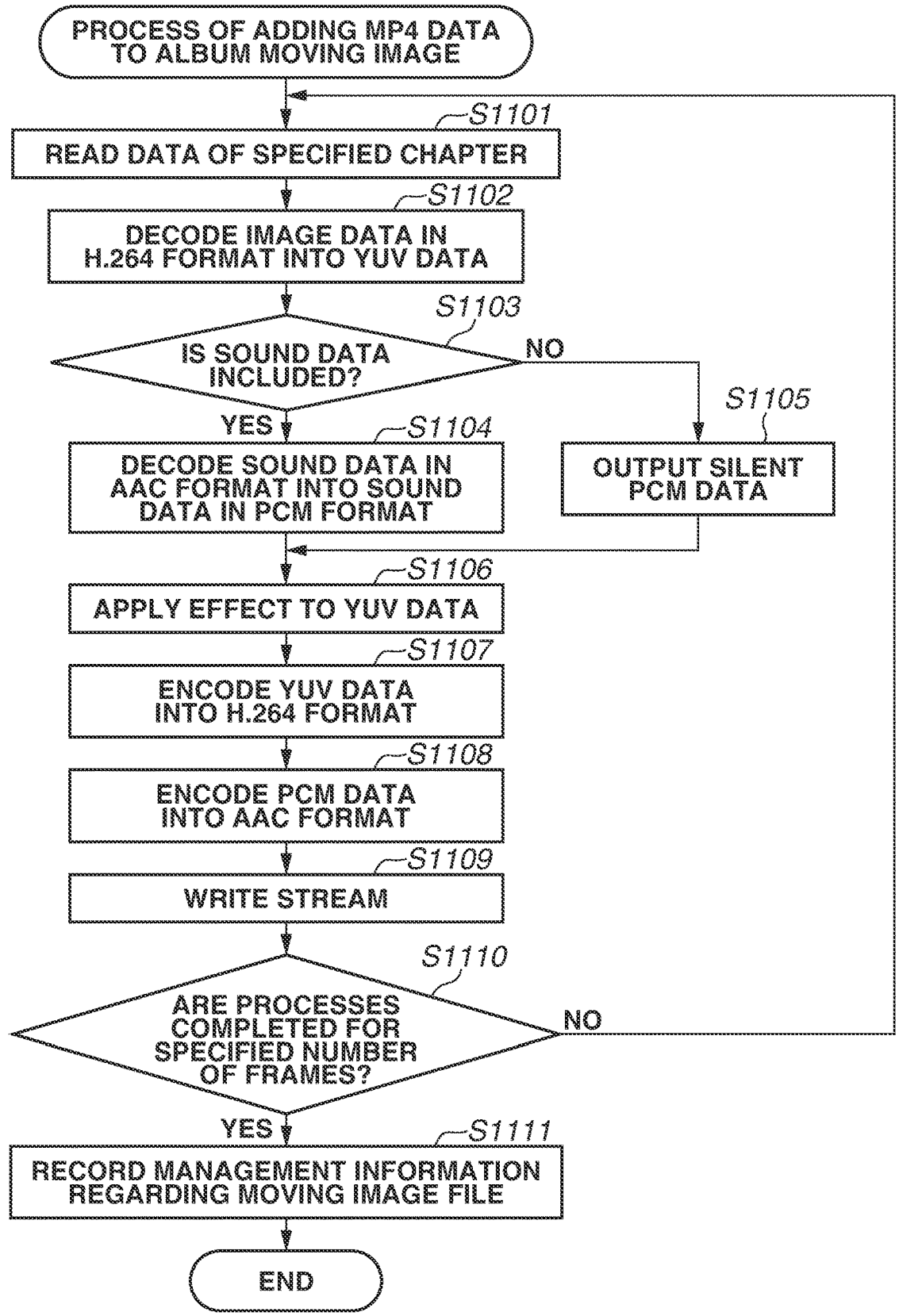
FIG. 11 is a flowchart illustrating a process of adding Moving Picture Experts Group (MPEG)-4 Part 14 (MP4) data to the album moving image.

Next, with reference to FIG. 11, the process of adding the data of the MP4 file to the file for the album moving image in step S705 will be described.

In step S1101, the control unit 101 reads, from the recording medium 141, data of a chapter having a chapter number identified from the chapter number 1503 in the MP4 file identified from the file information 1502 and temporarily holds the read data in the memory 104. At this time, in step S1101, the data of the identified chapter number is read. In particular units (group-of-pictures (GOP) units or frame units) in order from the beginning.

In step S1102, the control unit 101 decodes image (moving image) data in the H.264 format in the data of the chapter held in the memory 104 in step S1101 into YUV data using the image processing unit 111, and the processing proceeds to step S1103.

In step S1103, the control unit 101 determines whether sound data is included in the data of the chapter held in the memory 104 in step S1101. If it is determined that sound data is included (YES in step S1103), the processing proceeds to step S1104. If it is determined that sound data is not included (NO in step S1103), the processing proceeds to step S1105.

In step S1104, the control unit 101 decodes sound data in the AAC format held in the memory 104 into sound data in the PCM format using the sound processing unit 121, and the processing proceeds to step S1106.

On the other hand, in step S1105, the control unit 101 stores silent sound data in the PCM format in the memory 104 using the sound processing unit 121, and the processing proceeds to step S1106.

In step S1106, similar to steps S805 and S813, the control unit 101 applies an image processing effect to the YUV data held in the memory 104, using the image processing unit 111. Further, if the vertical and horizontal sizes of the YUV data are different from the vertical and horizontal sizes of the album moving image, the control unit 101 performs a process for resizing the YUV data to the vertical and horizontal sizes of the album moving image. In step S1107, similar to steps S806 and S816, the image processing unit 111 encodes the YUV data to which the effect is applied in step S1106, thereby converting the YUV data into image (moving image) data in the H.264 format.

In step S1108, the control unit 101 encodes the PCM data created in steps S1104 and S1105 into the AAC format using the sound processing unit 121, and the processing proceeds to step S1109. At this time, the control unit 101 encodes the PCM data at a bit rate greater than the bit rate of BGM data (AAC data) recorded in the non-volatile memory 105 and thereby can enhance the sound quality of the MP4 file to be recorded in the recording medium 141. The bit rate of BGM data to be recorded in the non-volatile memory 105 having capacity constraints is reduced, whereby it is possible to store a plurality of pieces of BGM data by making the capacity small.

In step S1109, similar to step S808, the control unit 101 adds stream data including the image data and the sound data generated in steps S1107 and S1108, respectively, to the file for the album moving image created in the recording medium 141 in step S701. In step S1110, the control unit 101 determines whether the processes of steps S1101 to S1109 are completed for the number of frames specified by the number of frames 1504. If it is determined that the processes are completed for the specified number of frames (YES in step S1110), the processing proceeds to step S1111. If it is determined that the processes are not completed (NO in step S1110), the processing returns to step S1101. Then, the processes of steps S1101 to S1109 are repeated until the processes are completed for the specified number of frames.

In step S1111, the control unit 101 updates and records file management information regarding the moving image file for the album to which the stream is added. The control unit 101 updates the management information such that a moving image generated from the chapter specified by the scenario is configured as a single chapter. As described above, the data for the album moving image generated from the chapter of the moving image specified by the scenario is added to the moving image file for the album.

Figure 12:
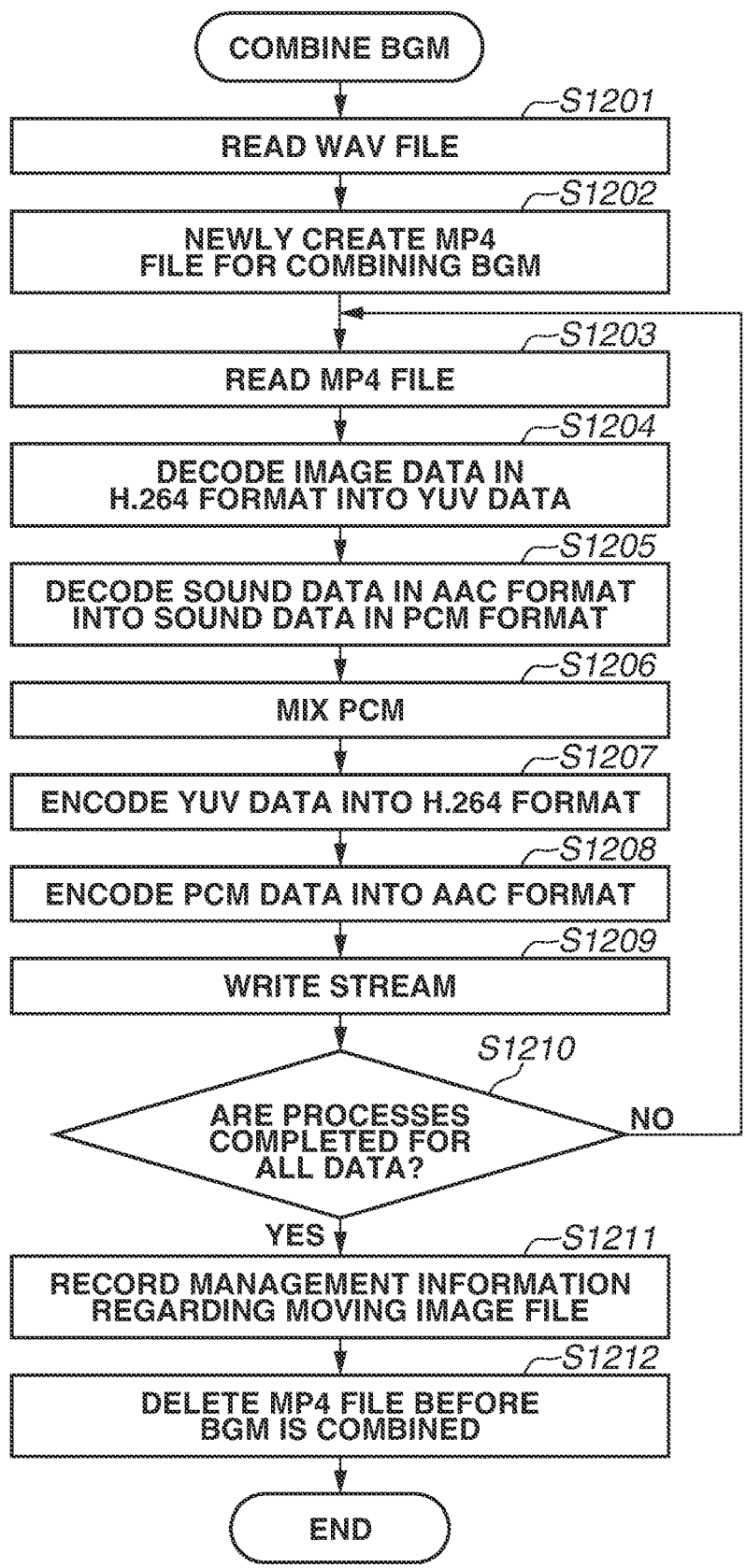
FIG. 12 is a flowchart illustrating a combining process for combining background music (BGM).

Next, with reference to FIG. 12, the process of combining the BGM with the MP4 file of the album moving image in step S709 will be described.

In step S1201, the control unit 101 reads from the recording medium 141 a Waveform Audio File Format (WAY) file selected as the BGM data to be combined and holds the read WAY file in the memory 104, and the processing proceeds to step S1202.

In step S1202, the control unit 101 newly creates an MP4 file for combining the BGM and records the newly created MP4 file in the recording medium 141.

In step S1203, the control unit 101 reads the data of the MP4 file of the album moving image from the recording medium 141 and holds the read data in the memory 104. At this time, the data of the MP4 file is read in predetermined units (GOP units, frame units, or time units) in order from the beginning.

In step S1204, the control unit 101 decodes image data in the H.264 format in the MP4 file held in the memory 104 in step S1203 into YUV data. In step S1205, the control unit 101 decodes sound data in the AAC format in the MP4 file held in the memory 104 in step S1203, thereby converting the sound data in the AAC format into sound data in the PCM format.

In step S1206, the control unit 101 performs a process for mixing PCM data of the WAV file held in the memory 104 in step S1201 with the PCM data decoded in step S1205, using the sound processing unit 121. At this time, the control unit 101 performs a combining process according to any of combining rates of 0%, 50%, and 100% described in the scenario as the rate of mixing, and the processing proceeds to step S1207.

In step S1207, the image processing unit 111 encodes the YUV data generated in step S1204 into H.264 data. In step S1208, the control unit 101 encodes into the ACC format the PCM data with which the BGM is mixed in step S1206. Then, in step S1209, the control unit 101 records, in the MP4 file for combining the BUM created in step S1202, stream data including the moving image data in the H.264 format acquired in step S1207 and the sound data in the AAC format acquired in step S1208. If stream data is already recorded, the above stream data is added. In step S1210, the control unit 101 determines whether the processes of steps S1203 to S1209 are completed for data of all the frames of the MP4 file of the album moving image specified as a target with which the BGM is to be combined. The processes of steps S1203 to S1209 are repeated until it is determined that the processes are completed. If it is determined that the processes of steps S1203 to S1209 are completed (YES in step S1210), then in step S1211, the control unit 101 records management information of the MP4 file for combining the BGM. Then, in step S1212, the control unit 101 deletes from the recording medium 141 the MP4 file before the BGM is combined that is specified as the BGM combining target.

As described above, the process for combining the BGM is executed.

Next, the reproduction of a preview in step S609 will be described.

In the preview reproduction process, similar to the album moving image saving process in step S606, an album moving image is created. In the preview reproduction process, however, the generated album moving image is not recorded in the recording medium 141, but is converted into data for display by the display control unit 131 and displayed on the display unit 130. Since the generated album moving image is not recorded in the recording medium 141, then immediately after YUV data is generated by resizing the album moving image and applying an effect to the album moving image, the YUV data may be converted into data for display and displayed on the display unit 130 without being encoded into the H.264 format.

As described above, in the image capturing apparatus 100 according to the present exemplary embodiment, when an album moving image is generated, recorded, or displayed (reproduced), and if a panoramic image is included as a reproduction target in the album moving image, a panning moving image is generated. Then, when the panning moving image is generated from the panoramic image, a cropping method is determined based on the image size in the long side direction or the aspect ratio of the panoramic image, the tempo of BGM, or the image capturing scene. Thus, it is possible to generate an appropriate moving image from a panoramic image.

Although in the present exemplary embodiment, an album moving image is generated and saved, the same album moving image may also be reproduced next time by saving a generated scenario in the recording medium 141. In this case, it is possible to change the aspect ratio of the album moving image to be output when reproduced. Thus, for example, also when the album moving image is output to an external display device having a different aspect ratio, an appropriate album moving image can be generated according to the display size of the external display device or the size of the display area where the image is displayed. In this case, the above processing is executed using the display size instead of the image size of the album moving image.

Other Exemplary Embodiments

While the present invention has been described in detail based on its suitable exemplary embodiments, the present invention is not limited to these specific exemplary embodiments. Embodiments of the present invention also include various forms without departing from the spirit and scope of the invention. Parts of the above exemplary embodiments may be appropriately combined together.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the Functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-023276, filed Feb. 13, 2018, which is hereby incorporated by reference herein in its entirety.

What is claimed is:

1. An image processing apparatus comprising:
a memory containing instructions; and
a controller executing the instructions to operate as:
an acquisition unit configured to acquire a panoramic image; and
a moving image generation unit configured to, based on a plurality of cropped images cropped from the panoramic image by sequentially moving a position of a cropping area, generate a moving image in which the plurality of cropped images is sequentially reproduced,
wherein according to a size in a predetermined direction or an aspect ratio of the panoramic image, the moving image generation unit switches whether to crop the panoramic image with an aspect ratio of the moving image generated by the moving image generation unit, or crop the panoramic image with an aspect ratio different from the aspect ratio of the moving image generated by the moving image generation unit.

2. The image processing apparatus according to claim 1, wherein when cropping the panoramic image, the moving image generation unit sequentially moves the position of the cropping area without changing an aspect ratio and a size of the cropping area.

3. The image processing apparatus according to claim 2, wherein according to an image size of the panoramic image and the aspect ratio size of the cropping area, the moving image generation unit determines an amount of movement of the position of the cropping area.

4. The image processing apparatus according to claim 1, wherein the moving image generation unit generates a moving image of a predetermined period regarding a single panoramic image.

5. The image processing apparatus according to claim 4, wherein according to an image size of the panoramic image, a size of the cropping area, and a length of the predetermined period, the moving image generation unit determines an amount of movement of the position of the cropping area.

6. The image processing apparatus according to claim 1, wherein when cropping the panoramic image, the moving image generation unit moves the position of the cropping area from one end portion to the other end portion in a long side direction of the panoramic image.

7. The image processing apparatus according to claim 1, wherein the moving image generation unit performs control to, in a case where a size of a long side of the panoramic image or a value obtained by dividing the size of the long side by a size of a short side of the panoramic image is smaller than a predetermined value, crop the panoramic image with the aspect ratio of the moving image generated by the moving image generation unit, and in a case where the size of the long side of the panoramic image or the value obtained by dividing the size of the long side by the size of the short side is greater than or equal to the predetermined value, crop the panoramic image with an aspect ratio for making a size of a side of the cropping area corresponding to the long side of the panoramic image larger than with the aspect ratio of the moving image generated by the moving image generation unit.

8. The image processing apparatus according to claim 7, wherein the moving image generation unit performs control to, in a case where the size of the long side of the panoramic image or the value obtained by dividing the size of the long side by the size of the short side is smaller than a predetermined value, crop the panoramic image with the aspect ratio of the moving image generated by the moving image generation unit, thereby generating a moving image, and in a case where the size of the long side of the panoramic image or the value obtained by dividing the size of the long side by the size of the short side is greater than or equal to the predetermined value, crop the panoramic image with an aspect ratio for making a size of a side of the cropping area corresponding to the long side of the panoramic image larger than with the aspect ratio of the moving image generated by the moving image generation unit and add predetermined data to the cropped image, thereby generating a moving image.

9. An image processing apparatus comprising:
a memory containing instructions; and
a controller executing the instructions to operate as:
an acquisition unit configured to acquire a panoramic image;
a moving image generation unit configured to crop a part of the panoramic image, thereby generating a moving image corresponding to the panoramic image from the cropped image, the moving image generation unit configured to sequentially move a position of a cropping area in a predetermined direction, thereby generating a moving image in which an area to be reproduced moves in the predetermined direction in the panoramic image; and
a control unit configured to control the moving image generation unit to, in a case where the panoramic image satisfies a predetermined condition, crop the panoramic image with the aspect ratio of the moving image generated by the moving image generation unit, and in a case where the panoramic image does not satisfy the predetermined condition, crop the panoramic image with an aspect ratio different from the aspect ratio of the moving image generated by the moving image generation unit.

10. The image processing apparatus according to claim 9, wherein the predetermined condition is that a person is included in the panoramic image.

\* \* \* \* \*